(12) United States Patent
Akashi et al.

(10) Patent No.: US 12,078,487 B2
(45) Date of Patent: Sep. 3, 2024

(54) METHOD FOR MANUFACTURING MULTI-AXIAL INERTIAL FORCE SENSOR

(71) Applicant: DENSO CORPORATION, Kariya (JP)

(72) Inventors: Teruhisa Akashi, Kariya (JP); Shota Harada, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/297,984

(22) Filed: Apr. 10, 2023

(65) Prior Publication Data

US 2023/0243656 A1 Aug. 3, 2023

Related U.S. Application Data

(63) Continuation of application No. PCT/JP2021/037997, filed on Oct. 14, 2021.

(30) Foreign Application Priority Data

Nov. 6, 2020 (JP) ................... 2020-185626

(51) Int. Cl.
*G01C 21/18* (2006.01)
*G01C 19/06* (2006.01)
(Continued)

(52) U.S. Cl.
CPC ........... *G01C 21/18* (2013.01); *G01C 19/065* (2013.01); *G01C 19/18* (2013.01); *G01C 19/5776* (2013.01); *G01C 19/5783* (2013.01)

(58) Field of Classification Search
CPC ...... G01C 21/18; G01C 19/065; G01C 19/18; G01C 19/5776; G01C 19/5783; G01P 15/18; G01P 21/00
See application file for complete search history.

(56) References Cited

U.S. PATENT DOCUMENTS 7,253,079 B2   8/2007 Hanson et al.
8,056,412 B2 * 11/2011 Rutkiewicz .......... G01C 21/166
                                                            73/510
(Continued)

FOREIGN PATENT DOCUMENTS

EP    2017628 A1 *  1/2009  ......... B81C 1/00301
JP    2004-037105 A   2/2004
(Continued)

OTHER PUBLICATIONS

Translation of PCT Written Opinion of the International Searching Authority of Application No. PCT/JP2021/037997, Dec. 28, 2021. ( Year: 2021).*

(Continued)

*Primary Examiner* — Vinh Luong
(74) *Attorney, Agent, or Firm* — Posz Law Group, PLC

(57) ABSTRACT

Before a pedestal is assembled, a sensitivity is inspected for each of sensors disposed in blocks respectively. In an inspection step, the blocks in which the sensors are disposed respectively are prepared. The blocks are fitted into main-axis groove portions of a main-axis tray, and the blocks are brought in contact with main-axis positioning surfaces of the main-axis groove portions to dispose the thickness direction of the main-axis tray and the main-axes of the sensors in parallel. The main-axis tray is arranged on a turntable such that a central axis of rotation of the turntable and the thickness direction of the main-axis tray are in parallel and that the central axis of rotation of the turntable and the main-axes of the sensors are in parallel. The turntable is made pivoting or swinging to inspect the sensitivities, in the main-axes, of the of sensors.

9 Claims, 16 Drawing Sheets

(51) Int. Cl.
  *G01C 19/18* (2006.01)
  *G01C 19/5776* (2012.01)
  *G01C 19/5783* (2012.01)

(56) References Cited

U.S. PATENT DOCUMENTS

| | | | |
|---|---|---|---|
| 2006/0042382 A1 | 3/2006 | DCamp et al. | |
| 2009/0255335 A1* | 10/2009 | Fly | G01C 19/5719 73/493 |
| 2011/0113881 A1* | 5/2011 | Suzuki | G01P 15/18 83/13 |
| 2014/0013843 A1 | 1/2014 | Buck et al. | |
| 2017/0199217 A1* | 7/2017 | Naruse | G01P 15/0802 |
| 2023/0243656 A1* | 8/2023 | Akashi | G01P 15/18 74/5.4 |
| 2023/0243866 A1* | 8/2023 | Akashi | G01P 15/18 73/510 |
| 2023/0324174 A1* | 10/2023 | Akashi | G01C 19/065 73/1.77 |
| 2023/0384344 A1* | 11/2023 | Sato | G01P 1/006 |

FOREIGN PATENT DOCUMENTS

| | | | |
|---|---|---|---|
| JP | 2006337197 A | * 12/2006 | |
| WO | WO-2014112355 A1 | * 7/2014 | B23K 26/20 |
| WO | WO-2022097439 A1 | * 5/2022 | G01C 19/00 |
| WO | WO-2022097440 A1 | * 5/2022 | G01C 19/065 |

OTHER PUBLICATIONS

Translation of WO 2014112355 A1, Yoshid et al., Jul. 24, 2014. (Year: 2014).*
Translation of JP 2006337197 A, Oki, Dec. 14, 2006 (Year: 2006).*
U.S. Appl. No. 18/297,929, filed Apr. 10, 2023, Akashi et al.

* cited by examiner

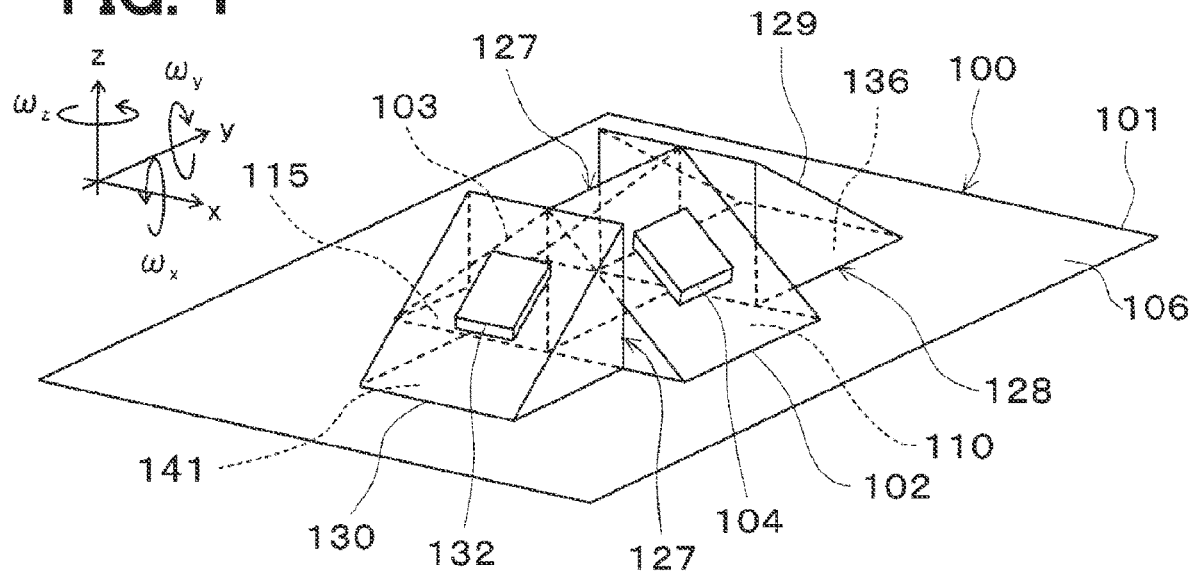
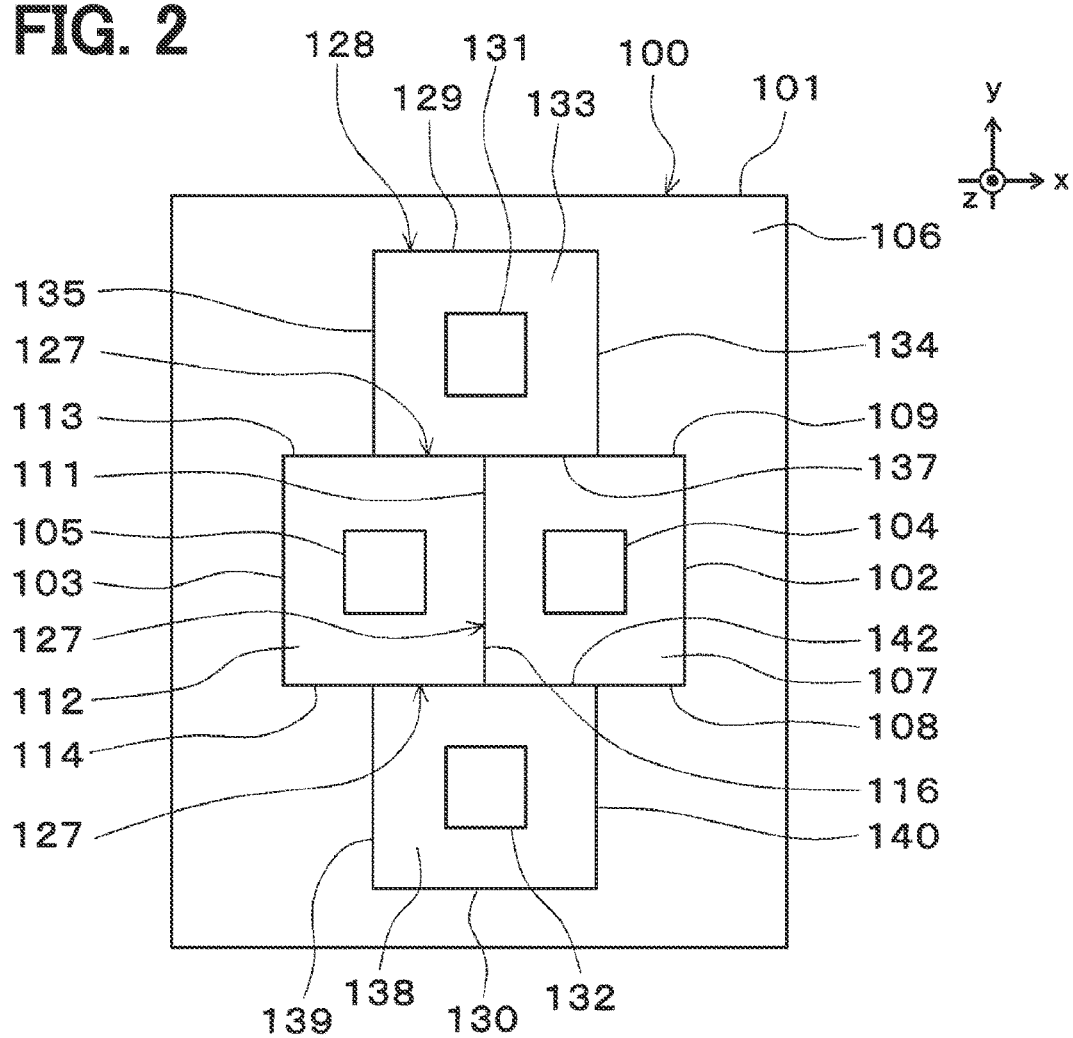

XV – XV CROSS-SECTIONAL VIEW

XVII – XVII CROSS-SECTIONAL VIEW

METHOD FOR MANUFACTURING MULTI-AXIAL INERTIAL FORCE SENSOR

CROSS REFERENCE TO RELATED APPLICATION

The present application is a continuation application of International Patent Application No. PCT/JP2021/037997 filed on Oct. 14, 2021, which designated the U.S. and claims the benefit of priority from Japanese Patent Application No. 2020-185626 filed on Nov. 6, 2020. The entire disclosures of all of the above applications are incorporated herein by reference.

TECHNICAL FIELD

The present disclosure relates to a method for manufacturing a multi-axial inertial force sensor.

BACKGROUND ART

A multi-axial inertial force system, in which sensors are installed on a substrate produced by combining boards, has conventionally been proposed. The substrate has blocks in which the respective sensors are disposed and which are disposed away from each other. Each block has an inclined surface on which the sensor is to be disposed.

SUMMARY

A multi-axial inertial force sensor including a mounting material, a plurality of blocks and a plurality of sensors is manufactured in a manufacturing method. Before a pedestal is assembled, a sensitivity is inspected for each of sensors disposed in the blocks respectively. In an inspection step, the blocks in which the sensors are disposed respectively are prepared. The blocks are fitted into main-axis groove portions of a main-axis tray, and the blocks are brought in contact with main-axis positioning surfaces of the main-axis groove portions to dispose the thickness direction of the main-axis tray and the main-axes of the sensors in parallel. The main-axis tray is arranged on a turntable such that a central axis of rotation of the turntable and the thickness direction of the main-axis tray are in parallel and that the central axis of rotation of the turntable and the main-axes of the sensors are in parallel. The turntable is made pivoting or swinging to inspect the sensitivities, in the main-axes, of the of sensors.

BRIEF DESCRIPTION OF DRAWINGS

The above and other objects, features, and advantages of the present disclosure will become more apparent from the following detailed description with reference to the accompanying drawings. In the accompanying drawings:

FIG. 1 is a perspective view of a multi-axial inertial force sensor according to a first embodiment;

FIG. 2 is a top view of the multi-axial inertial force sensor illustrated in FIG. 1;

DESCRIPTION OF EMBODIMENTS

Figure 3:
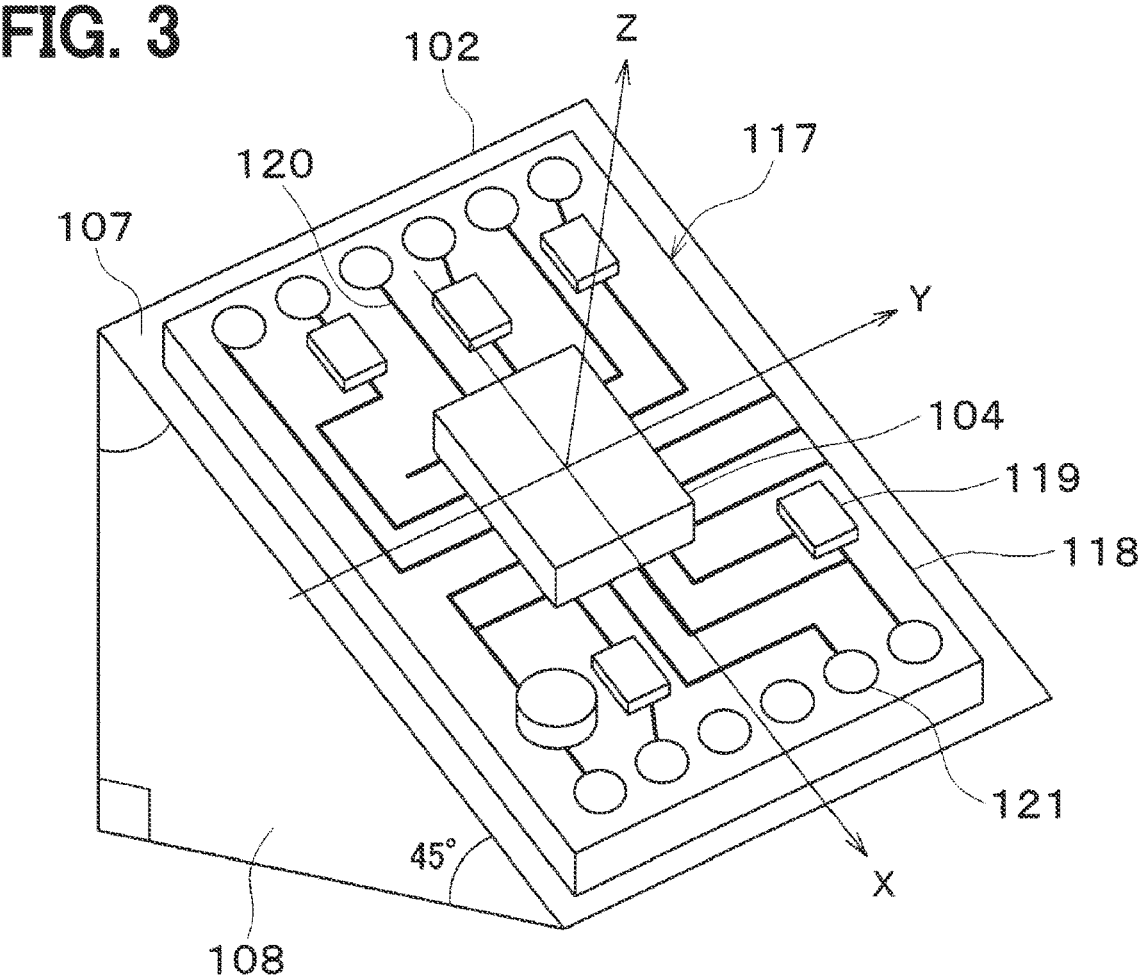
FIG. 3 is a perspective view illustrating a state where a first sensor is installed in a first block.

A multi-axial inertial force system, in which sensors are installed on a substrate produced by combining boards, has conventionally been proposed. The substrate has blocks in which the respective sensors are disposed and which are disposed away from each other. Each block has an inclined surface on which the sensor is to be disposed. The respective inclined surfaces are inclined such that detection axes of the respective sensors are orthogonal to each other. This enables measurement of inertial forces in multiple axes.

In the above-described conventional technique, however, the blocks are configured to be disposed apart from each other. Therefore, an error is likely to occur in the relative positioning of the respective blocks. Thus, the orthogonality of the detection axes of the respective sensors may be deceased.

In addition, it is necessary to measure the sensitivities, in the detection axes, of all the sensors in a state where the respective sensors are mounted on the respective blocks. In short, it is necessary to measure the sensitivities before and after the blocks are mounted on the substrate. Therefore, the number of inspection steps becomes very large.

The present disclosure provides a method for manufacturing a multi-axial inertial force sensor capable of securing orthogonality of main-axes of respective sensors and reducing man-hours in an inspection step.

According to a first aspect and a second aspect of the present disclosure, a multi-axial inertial force sensor including a mounting material, a plurality of blocks and a plurality of sensors is manufactured in a manufacturing method.

The mounting material has an installation surface. The plurality of blocks are disposed on the installation surface of the mounting material, and have inclined surfaces inclined with respect to the installation surface. The plurality of sensors are disposed on the inclined surfaces of the plurality of blocks, respectively, and configured to detect inertial force corresponding to main-axes.

The plurality of blocks have a positioning portion that, when the blocks come into contact with at least one or multiple of the plurality of blocks, relatively positions the blocks with respect to contact partners, and a pedestal is configured with the blocks assembled into a state where the blocks are positioned relative to each other on the basis of the positioning portion and a state where the inclined surfaces are oriented in different directions from each other.

The manufacturing method of the multi-axial inertial force sensor has an inspection step of inspecting a sensitivity of each of the plurality of sensors disposed in the plurality of blocks, respectively, before the pedestal is assembled.

In the first aspect, the inspection step includes a first step, a second step, a third step, a fourth step and a fifth step.

In the first step, preparing the plurality of blocks in which the plurality of sensors are disposed, respectively.

In the second step, preparing a main-axis tray in which a plurality of main-axis groove portions are formed. As the main-axis tray, the plurality of main-axis groove portions having main-axis positioning surfaces are prepared. The main-axis positioning surfaces are in contact with the plurality of blocks for positioning such that a thickness direction of the main-axis tray, corresponding to a depth direction of the main-axis groove portions, is parallel to the main-axes of the sensors.

In the third step, fitting the plurality of blocks into the plurality of main-axis groove portions of the main-axis tray, and bringing the plurality of blocks into contact with the main-axis positioning surfaces of the plurality of main-axis groove portions to dispose the thickness direction of the main-axis tray and the main-axes of the sensors in parallel.

In the fourth step, preparing an inspection device including a turntable, and installing the main-axis tray on the turntable to dispose a central axis of rotation of the turntable and the thickness direction of the main-axis tray in parallel and to dispose the central axis of rotation of the turntable and the main-axes of the plurality of sensors in parallel.

In the fifth step, pivoting or swinging the turntable to inspect the sensitivities, in the main-axes, of the plurality of sensors.

In the second aspect, the inspection step includes a first step, a second step, a third step, a fourth step and a fifth step.

In the first step, preparing the plurality of blocks in which the plurality of sensors are disposed, respectively.

In the second step, preparing an inspection tray in which a plurality of groove portions are formed. As the inspection tray, the plurality of groove portions have positioning surfaces with which the plurality of blocks are in contact for positioning such that a thickness direction of the inspection tray, corresponding to a depth direction of the groove portions, is parallel to the main-axes of the sensors.

In the third step, fitting the plurality of blocks into the plurality of groove portions of the inspection tray and bringing the plurality of blocks into contact with the positioning surfaces of the plurality of groove portions to dispose the thickness direction of the inspection tray and the main-axes of the sensors in parallel.

In the fourth step, preparing an inspection device including a turntable having a gimbal mechanism. The inspection tray is arranged on the gimbal mechanism to dispose a central axis of rotation of the turntable and the thickness direction of the inspection tray in parallel and to dispose the central axis of rotation of the turntable and the main-axes of the plurality of sensors in parallel.

In the fifth step, pivoting or swinging the turntable to inspect the sensitivities, in three axes of the main-axes, first other-axes that are axes perpendicular to the main-axes, and second other-axes that are axes perpendicular to the main-axes and the first other-axes, of the plurality of sensors.

Further, in the fifth step, the sensitivities in three axes of the main-axes, the first other-axes, and the second other-axes are inspected in a state where a central axis of rotation of the turntable and the first other-axes of the plurality of sensors are disposed in parallel by the gimbal mechanism. The sensitivities in the three axes of the main-axes, the first other-axes, and the second other-axes are inspected in a state where the central axis of rotation of the turntable and the second other-axes of the plurality of sensors are disposed in parallel by the gimbal mechanism.

Accordingly, the accuracies of the relative positions of the respective sensors are secured by the positioning portion of the plurality of blocks. Therefore, the axis orthogonality of the respective sensors is specified with high accuracy by assembling the pedestal. Therefore, the orthogonality of the main-axes of the respective sensors can be secured.

In addition, the axis orthogonality of the respective sensors is secured in the state of the pedestal. Therefore, it is not necessary, after the sensitivity of each sensor is inspected in units of each block before the pedestal is assembled, to again inspect the sensitivities of the respective sensors in the state of the pedestal. Therefore, man-hours in the inspection step can be reduced.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Hereinafter, a first embodiment will be described with reference to the drawings. As illustrated in FIG. 1 and FIG. 2, a multi-axial inertial force sensor 100 includes a mounting material 101, a first block 102, a second block 103, a first sensor 104, and a second sensor 105.

The mounting material 101 has an installation surface 106. The mounting material 101 is, for example, a single-layer or multi-layer printed circuit board. Electronic components, such as a microcomputer and a large scale integration (LSI), are mounted on the mounting material 101. The mounting material 101 is housed in a non-illustrated housing.

The respective blocks 102 and 103 are bases on which the respective sensors 104 and 105 are disposed, respectively. The respective blocks 102 and 103 are disposed on the installation surface 106 of the mounting material 101. The respective blocks 102 and 103 are of the same size and shape. The insides of the respective blocks 102 and 103 may be hollow. The respective blocks 102 and 103 are formed of a material such as metal, resin, or ceramic.

As illustrated in FIG. 1, the first block 102 is a triangular prism having an inclined surface 107, a pair of end surfaces 108 and 109, and a pair of side surfaces 110 and 111. The inclined surface 107 is inclined with respect to the installation surface 106 of the mounting material 101. The pair of end surfaces 108 and 109 are triangular surfaces connected to the inclined surface 107. The pair of side surfaces 110 and 111 are quadrangular surfaces connected to the inclined surface 107 and the pair of end surfaces 108 and 109. One side surface 110 of the pair of side surfaces 110 and 111 is disposed on the installation surface 106 of the mounting material 101.

The pair of end surfaces 108 and 109 has a right-angled isosceles triangle shape. The inclined surface 107 corresponds to the oblique sides of the respective end surfaces 108 and 109 of the right-angled isosceles triangle. Therefore, the inclined surface 107 is inclined at an angle of 45° with respect to the installation surface 106 of the mounting material 101.

Similarly to the first block 102, the second block 103 is a triangular prism having an inclined surface 112, a pair of end surfaces 113 and 114, and a pair of side surfaces 115 and 116. As described above, the shape of each of the blocks 102 and 103 is a simple triangular prism, so that mass production by injection molding can be performed. Therefore, the manufacturing cost of each of the blocks 102 and 103 can be suppressed.

As illustrated in FIG. 3, the first block 102 has electronic components 117 provided on the inclined surface 107. The electronic component 117 has a mounting substrate 118, an external component 119, external wiring 120, and a draw-out part 121.

The mounting substrate 118 is, for example, a printed circuit board. The first sensor 104 is mounted on the mounting substrate 118 by soldering. The mounting substrate 118 is fixed to the inclined surface 107 with an adhesive or the like.

The external component 119 is a component such as a chip resistor. The external wiring 120 is formed on the surface of the mounting substrate 118 and is connected to the first sensor 104 and the external component 119.

The draw-out part 121 is connected to the external wiring 120. The draw-out part 121 is an electrical connection part that takes out a signal of the first sensor 104 to the outside and supplies power from the outside to the first sensor 104. The draw-out part 121 is connected to an electric circuit of the mounting material 101. A socket for a flexible substrate may be used as the draw-out part 121.

Similarly to the above, the electronic component 117 and the second sensor 105 are mounted on the second block 103. That is, the respective sensors 104 and 105 are disposed on the respective inclined surfaces 107 and 112 of the respective blocks 102 and 103, respectively. In short, one first sensor 104 is disposed in the first block 102, and one second sensor 105 is disposed in the second block 103.

In FIG. 1 and FIG. 2, the electronic components 117 disposed in the respective blocks 102 and 103 are omitted. Also in the following drawings, the electronic components 117 disposed in the respective blocks 102 and 103 are omitted as appropriate.

Each of the sensors 104 and 105 is a single-axis gyro sensor that detects an angular velocity as an inertial force corresponding to a main-axis. When directions perpendicular to the respective inclined surfaces 107 and 112 of the respective blocks 102 and 103 are defined as Z-axes, the main-axes of the respective sensors 104 and 105 are disposed parallel to the Z-axes. Therefore, each of the sensors 104 and 105 detects an angular velocity around the Z-axis as the inertial force.

Each of the sensors 104 and 105 is configured as, for example, a resin mold package. The package contains a sensor element and an application specific integrated circuit (ASIC). The sensor element is preferably configured as wafer level packaging (WLP). In short, the sensor element and an integrated circuit (IC) that operates the sensor element to read a signal are collectively referred to as the gyro sensor. Each of the sensors 104 and 105 may be configured as a ceramic package. The package may be opened.

Figure 4:
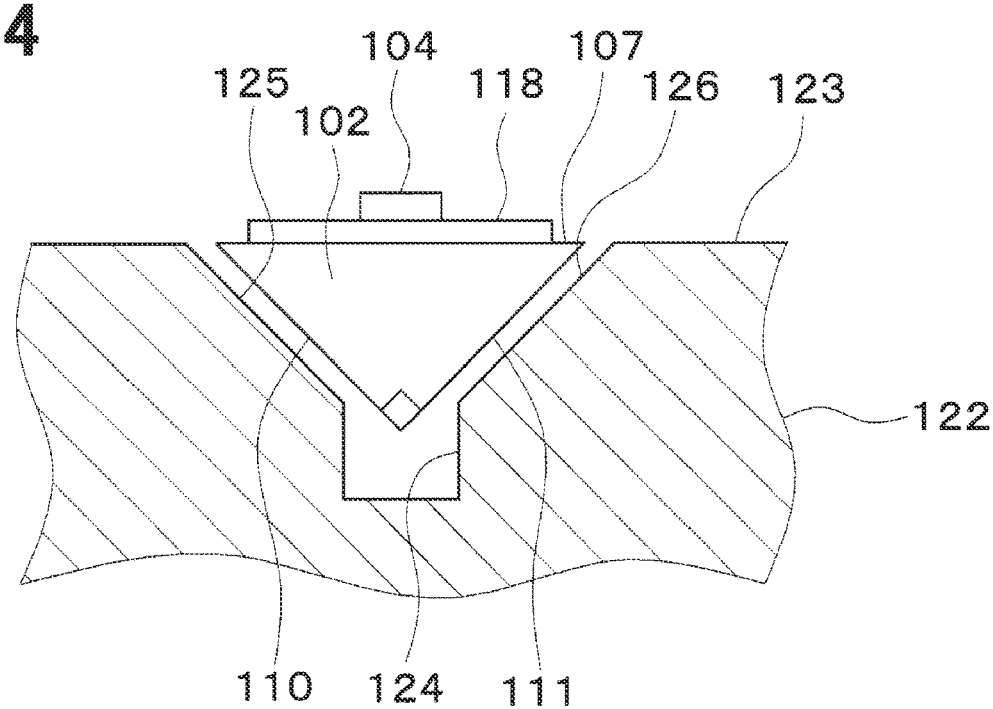
FIG. 4 is a partial cross-sectional view illustrating a state where the first block is installed on a fitting plate.

As illustrated in FIG. 4, the mounting substrate 118, on which the first sensor 104 is mounted, is fixed to the first block 102 by using a fitting plate 122. The fitting plate 122 has a flat surface 123 and a groove portion 124. The groove portion 124 is a portion of the fitting plate 122 in which a part of the flat surface 123 is recessed. The groove portion 124 has substantially the same shape as the outer shape. The groove portion 124 has at least wall surfaces 125 and 126 with which the respective side surfaces 110 and 111 of the first block 102 are in contact.

The first block 102 is fitted into the groove portion 124 such that the respective side surfaces 110 and 111 of the first block 102 are in contact with the respective wall surfaces 125 and 126 of the groove portion 124. As a result, the inclined surface 107 of the first block 102 becomes parallel to the flat surface 123 of the fitting plate 122. The flat surface 123 of the fitting plate 122 is horizontally fixed in advance, whereby the inclined surface 107 of the first block 102 is horizontally disposed. In this state, the mounting substrate 118 and the first sensor 104 are mounted on the first block 102 by a substrate mounting technique, a reflow mounting technique, or the like.

The first sensor 104 is a Z-axis gyro sensor. Therefore, in the mounting of the first sensor 104 on the first block 102, an axial misalignment, in the main-axis direction, that is, in the Z-axis direction, with respect to the inclined surface 107 never becomes large even if misalignments in both directions of a first other-axis perpendicular to the main-axis and a second other-axis perpendicular to the main-axis and the first other-axis are not precisely controlled. The first other-axis is an X-axis. The second other-axis is a Y-axis. Similarly to the above, the electronic component 117 and the second sensor 105 are also mounted on the second block 103.

Note that, in a case where the main-axis of each of the sensors 104 and 105 is the X-axis or the Y-axis, it is necessary to mount the respective sensors 104 and 105, the positions of which are being controlled, on the respective blocks 102 and 103.

In the above configuration, each of the blocks 102 and 103 is assembled on the installation surface 106 of the mounting material 101, as illustrated in FIG. 1 and FIG. 2. Here, an axis perpendicular to the installation surface 106 of the mounting material 101 is defined as the z-axis. A direction orthogonal to the z-axis and parallel to the installation surface 106 is defined as the x-axis. A direction orthogonal to the z-axis and the x-axis and parallel to the installation surface 106 is defined as the y-axis. The x-axis and the y-axis are axes parallel to the installation surface 106. The respective blocks 102 and 103 are aligned along the x-axis.

Each of the blocks 102 and 103 has a positioning portion 127 that relatively determines a position with a contact partner when the blocks come into contact with each other. The positioning portion 127 is a portion, butting a contact partner, of each of the blocks 102 and 103. The positioning portion 127 is a contact portion with a contact partner.

The respective blocks 102 and 103 are assembled into a state where their relative positions are determined each other on the basis of the positioning portions 127. In addition, the respective blocks 102 and 103 are assembled into a state where the respective inclined surfaces 107 and 112 are oriented in different directions from each other. As a result, the respective blocks 102 and 103 configure a part of a pedestal 128. The respective blocks 102 and 103 are connected by an adhesive.

The multi-axial inertial force sensor 100 includes, in addition to the respective blocks 102 and 103 and the respective sensors 104 and 105, a third block 129, a fourth block 130, a third sensor 131, and a fourth sensor 132.

The third block 129 is a triangular prism having an inclined surface 133, a pair of end surfaces 134 and 135, and a pair of side surfaces 136 and 137. The fourth block 130 is a triangular prism having an inclined surface 138, a pair of end surfaces 139 and 140, and a pair of side surfaces 141 and 142.

All of the respective blocks 102, 103, 129, and 130 are of the same size and shape. The third sensor 131 and the fourth sensor 132 are single-axis gyro sensors that detect an angular velocity as an inertial force corresponding to a main-axis. The third sensor 131 is disposed on the inclined surface 133 of the third block 129 together with the electronic component 117. The fourth sensor 132 is disposed on the inclined surface 138 of the fourth block 130 together with the electronic component 117.

The pedestal 128 is configured by disposing the respective blocks 102, 103, 129, and 130 point-symmetrically with respect to a reference point of the installation surface 106 of the mounting material 101. The pedestal 128 is assembled into a chevron shape with the first block 102 and the second block 103 sandwiched by the third block 129 and the fourth block 130.

Specifically, in the pedestal 128, the other side surface 111 of the first block 102 and the other side surface 116 of the second block 103 face each other and are disposed without a gap. In addition, the respective blocks 102 and 103 are assembled without a gap with the respective side surfaces 111 and 116 being in contact with each other.

The third block 129 and the fourth block 130 are disposed along the y-axis. The other side surface 137 of the third block 129, the other end surface 109 of the first block 102, and one end surface 113 of the second block 103 face each other and are disposed without a gap. The other side surface 142 of the fourth block 130, one end surface 108 of the first block 102, and the other end surface 114 of the second block 103 face each other and are disposed without a gap. As a result, the pedestal 128 configures a chevron shape.

The respective sensors 104, 105, 131, and 132 are disposed on the inclined surfaces 107, 112, 133, and 138 of the pedestal 128, respectively, so that the main-axes are oriented in different directions from each other. A part of each of the end surfaces 108 and 109 and the other side surface 111 of the first block 102, and a part of each of the end surfaces 113 and 114 and the other side surface 116 of the second block 103 serve as the positioning portions 127. A part of the other side surface 137 of the third block 129 and a part of the other side surface 142 of the fourth block 130 serve as the positioning portions 127. As a result, the orthogonal accuracies of the main-axes of the respective sensors 104, 105, 131, and 132 are ensured by the shape accuracies of the respective blocks 102, 103, 129, and 130.

The multiaxialization is achieved by assembling each of the blocks 102, 103, 129, and 130. In short, the multi-axial inertial force sensor 100 is a three-axis gyro sensor. The positioning portions 127 specify the accuracies of the relative positions of the respective sensors 104, 105, 131, and 132. The processing shapes of the respective blocks 102, 103, 129, and 130 are managed and the shape accuracies of the respective blocks 102, 103, 129, and 130 are secured, so that the axis orthogonality of the respective sensors 104, 105, 131, and 132 is sufficiently ensured.

The respective sensors 104, 105, 131, and 132 are disposed on the respective inclined surfaces 107, 112, 133, and 138 of the pedestal 128, respectively, so that the main-axes are oriented in different directions from each other. In short, the main-axes of the respective sensors 104, 105, 131, and 132 are inclined with respect to the installation surface 106 of the mounting material 101. Therefore, the respective sensors 104, 105, 131, and 132 detect vector components of angular velocities corresponding to the main-axes, respectively. The overall configuration of the multi-axial inertial force sensor 100 has been described above.

Next, a principle of detecting angular velocities in three axes will be described. First, an angular velocity around the z-axis is defined as a yaw, that around the x-axis is defined as a roll, and that around the y-axis is defined as a pitch. Each of the sensors 104, 105, 131, and 132 can determine the rotation direction of an angular velocity from the direction in which the angular velocity is applied.

Figure 5:
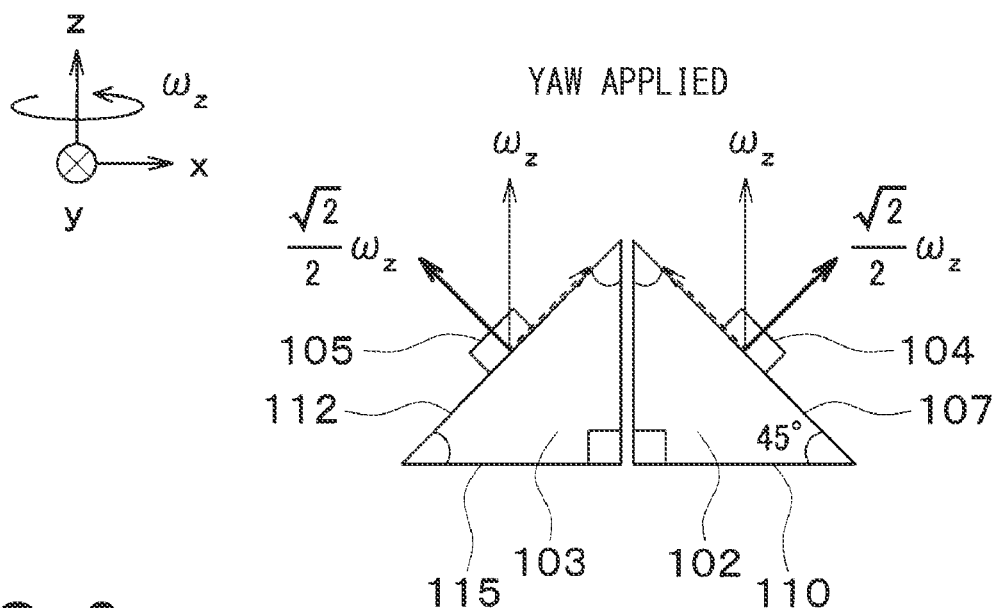
FIG. 5 is a view illustrating vector components when a yaw is applied to the first sensor and a second sensor.

First, when a yaw is applied to the multi-axial inertial force sensor 100, an angular velocity $\omega z$ is applied to each of the sensors 104, 105, 131, and 132. The respective inclined surfaces 107 and 112 of the first block 102 and the second block 103 are inclined at an angle of 45° with respect to the Z-axes. Therefore, when the angular velocity $\omega z$ is vector-decomposed, a vector component of $\sqrt{2}\omega z/2$ is applied in the Z-axes of the first sensor 104 and the second sensor 105, as illustrated in FIG. 5. Although the angular velocity of $\sqrt{2}\omega/2$ is applied in the respective other-axes, there is no influence on the main-axis sensitivities of the first sensor 104 and the second sensor 105.

Figure 6:
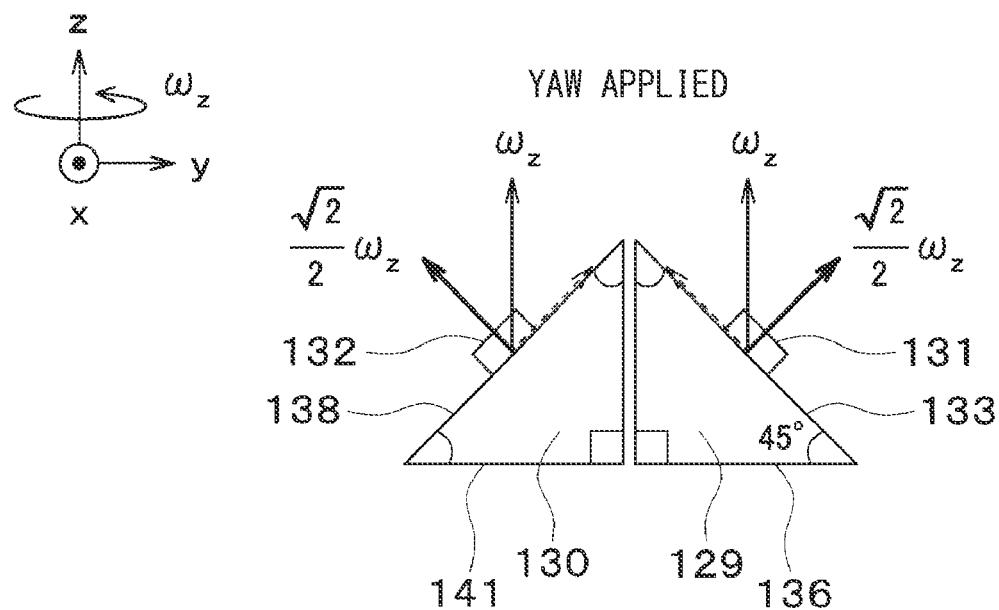
FIG. 6 is a view illustrating vector components when a yaw is applied to a third sensor and a fourth sensor.

In addition, a vector component of $\sqrt{2}\omega/2$ is applied in the Z-axes of the third sensor 131 and the fourth sensor 132, as illustrated in FIG. 6. That is, an angular velocity of $\sqrt{2}\omega/2$ is applied in the Z-axes of the four sensors 104, 105, 131, and 132. The inclined surfaces 133 and 138 of the third sensor 131 and the fourth sensor 132 are inclined at an angle of 45° with respect to the installation surface 106 of the mounting material 101. Therefore, an equal angular velocity is applied in the respective other-axes of the third sensor 131 and the fourth sensor 132, but there is no influence on the main-axis sensitivities of the third sensor 131 and the fourth sensor 132.

Figure 7:
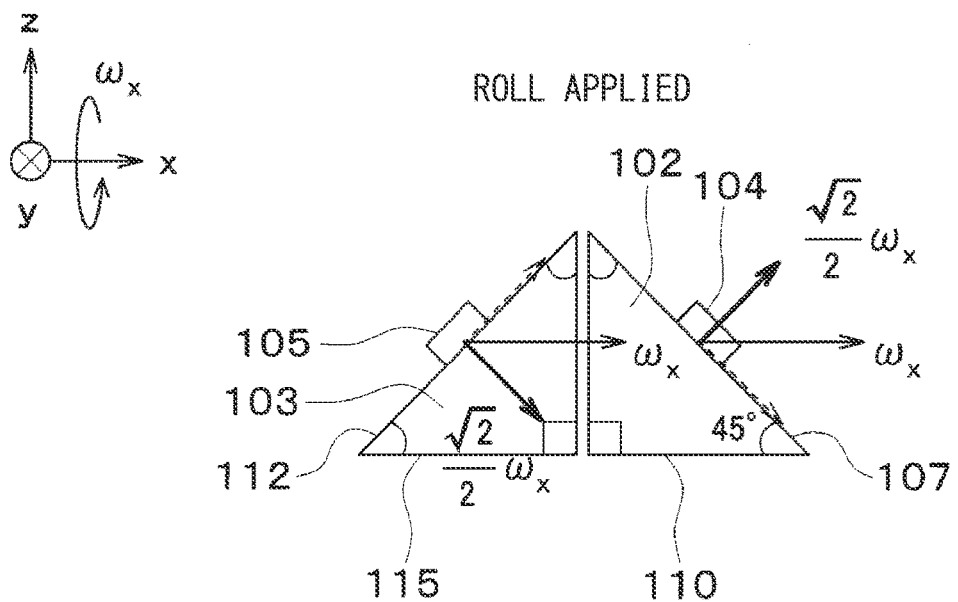
FIG. 7 is a view illustrating vector components when a roll is applied to the first sensor and the second sensor.

When a roll is applied to the multi-axial inertial force sensor 100, an angular velocity $\omega x$ is applied to the respective sensors 104, 105, 131, and 132. When the angular velocity $\omega x$ is vector-decomposed, a vector component of $\sqrt{2}\omega x/2$ is applied in the Z-axes of the first sensor 104 and the second sensor 105, as illustrated in FIG. 7.

Figure 8:
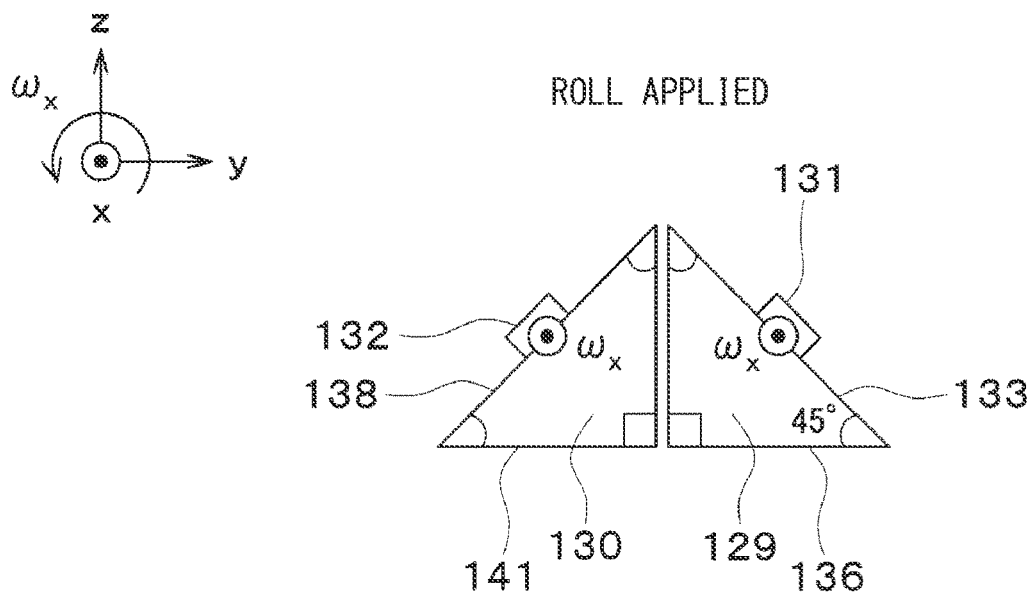
FIG. 8 is a view illustrating vector components when a roll is applied to the third sensor and the fourth sensor.

On the other hand, the angular velocity ωx is applied in the second other-axes of the third sensor 131 and the fourth sensor 132, as illustrated in FIG. 8. Therefore, the main-axis sensitivities of the third sensor 131 and the fourth sensor 132 do not change.

Figure 9:
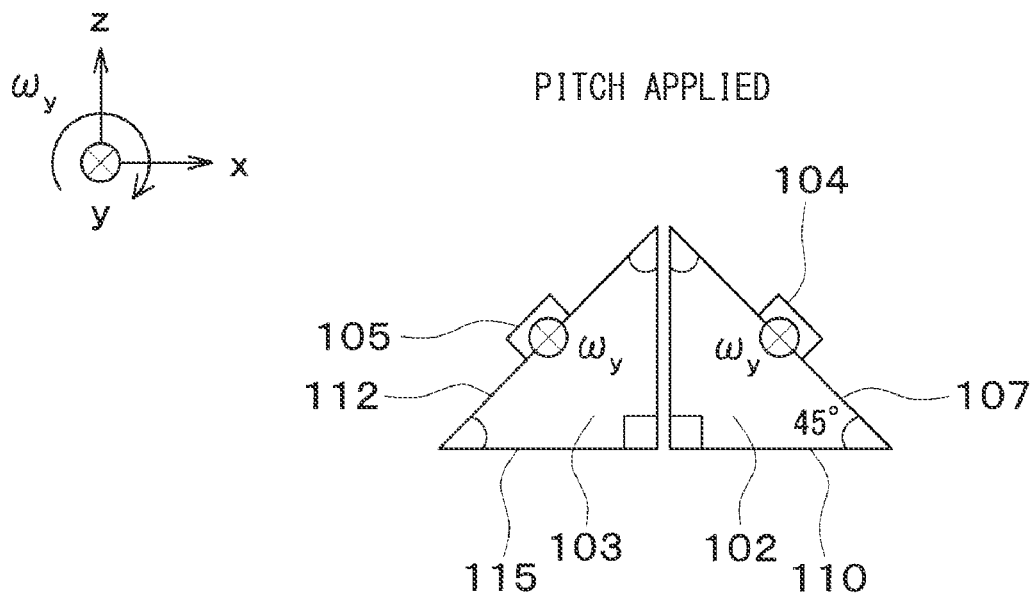
FIG. 9 is a view illustrating vector components when a pitch is applied to the first sensor and the second sensor.

When a pitch is applied to the multi-axial inertial force sensor 100, an angular velocity ωy is applied to the respective sensors 104, 105, 131, and 132. When the angular velocity ωy is vector-decomposed, the angular velocity ωy is applied in the second other-axes of the first sensor 104 and the second sensor 105, as illustrated in FIG. 9. Therefore, the main-axis sensitivities of the first sensor 104 and the second sensor 105 do not change.

Figure 10:
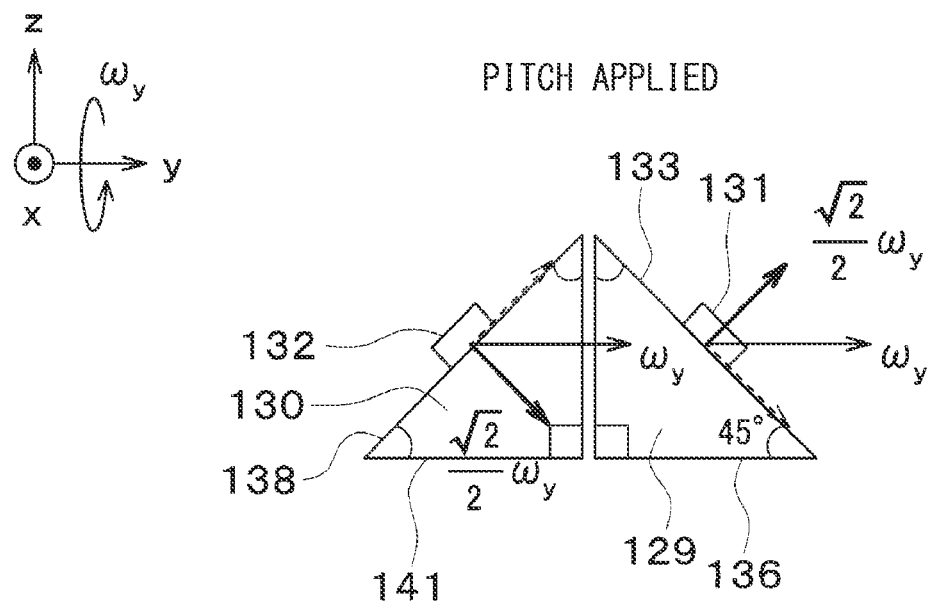
FIG. 10 is a view illustrating vector components when a pitch is applied to the third sensor and the fourth sensor.

When the angular velocity ωy is vector-decomposed, a vector component of $\sqrt{2}\omega y/2$ is applied in the Z-axes of the third sensor 131 and the fourth sensor 132, as illustrated in FIG. 10. Although the angular velocity of $\sqrt{2}\omega y/2$ is applied in the respective other-axes, there is no influence on the main-axis sensitivities of the third sensor 131 and the fourth sensor 132.

From the above principle, when the angular velocities applied around the x-axis, the y-axis, and the z-axis are vector-decomposed, they can be detected as an angular velocity around the Z-axis, and the directions of the angular velocities can also be detected. That is, each of the sensors 104, 105, 131, and 132 is a Z-axis gyro sensor, and thus the multi-axial inertial force sensor 100 functions as an x-, y-, and z-axis gyro sensor. Therefore, angular velocities in three axes can be detected.

In addition, the first sensor 104 and the second sensor 105 each detect a vector component of an angular velocity, so that even if any one of them becomes undetectable, it is possible to detect as the vector component of an angular velocity corresponding to the main-axis of the other. That is, redundancy can be secured. Therefore, even if one of the first sensor 104 and the second sensor 105 becomes undetectable, it is possible to detect a movement corresponding to the main-axis of the first sensor 104 and the second sensor 105 that become undetectable. The same applies to the third sensor 131 and the fourth sensor 132.

Next, a method for manufacturing the multi-axial inertial force sensor 100 will be described. First, the respective blocks 102, 103, 129, and 130, the electronic component 117, and the respective sensors 104, 105, 131, and 132 are prepared. Then, the electronic component 117 and the respective sensors 104, 105, 131, and 132 are mounted on the respective blocks 102, 103, 129, and 130 by using the fitting plates 122, as illustrated in FIG. 4.

Figure 11:
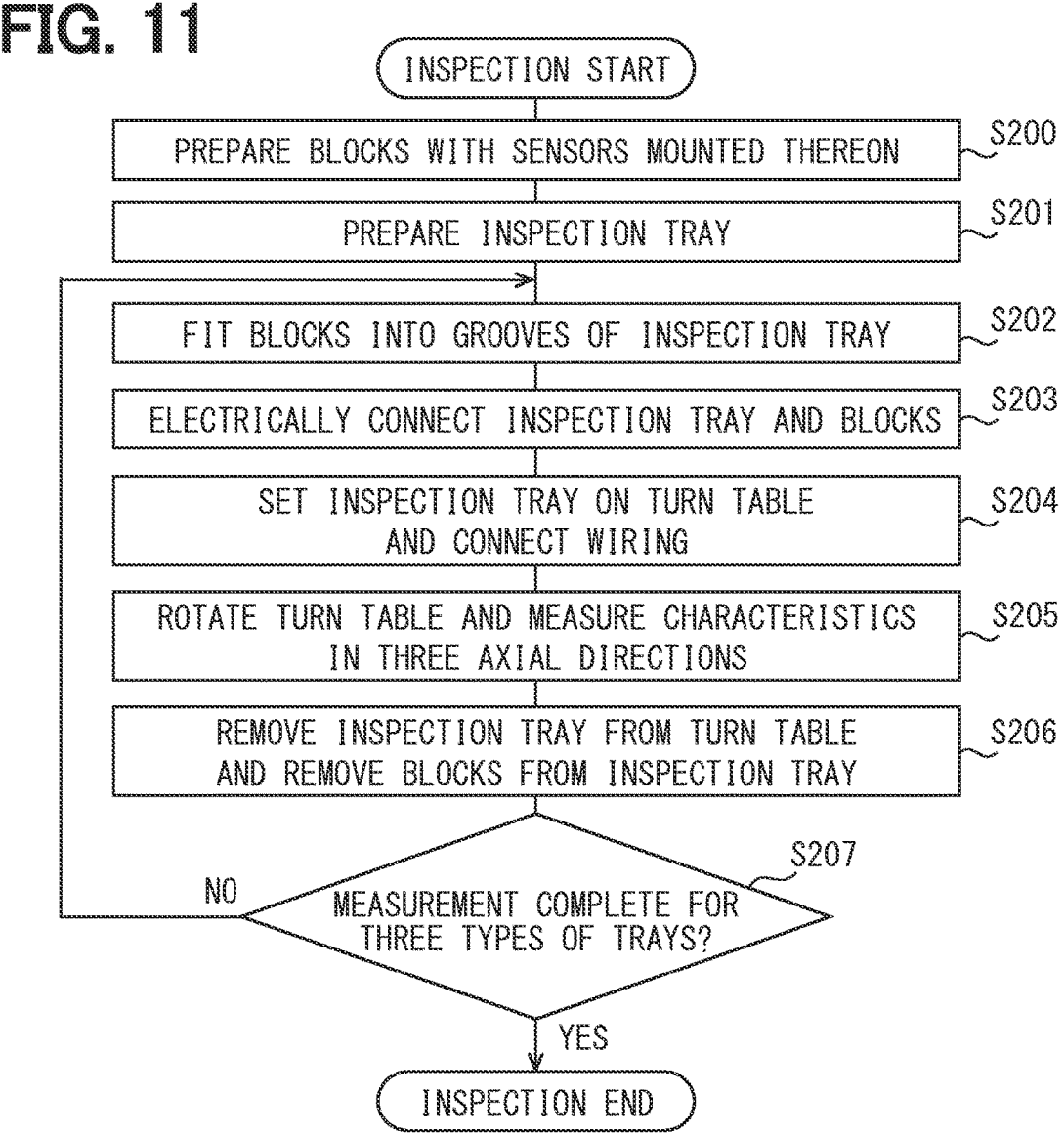
FIG. 11 is a flowchart showing an inspection step according to the first embodiment.

Subsequently, an inspection step is performed according to the flowchart illustrated in FIG. 11. The inspection step is a step of, before assembling the pedestal 128, inspecting the sensitivities of the respective sensors 104, 105, 131, and 132 disposed in the respective blocks 102, 103, 129, and 130, respectively.

In the inspection step, the respective blocks 102, 103, 129, and 130 are rotated in three axes, respectively, to measure the sensitivities in the main-axis and the respective other-axes. As a result, the main-axis sensitivity, the other-axis sensitivities, the scale factors, and the linearity and non-linearity of the sensitivities can be found.

The axis orthogonality of the respective sensors 104, 105, 131, and 132 is secured by butting the respective blocks 102, 103, 129, and 130 for positioning. Therefore, the shape accuracies of the respective blocks 102, 103, 129, and 130 determine the axis orthogonality. As described above, the axis orthogonality depends on the outer shape accuracies of the respective blocks 102, 103, 129, and 130, so that, in inspecting the respective sensors 104, 105, 131, and 132, it is preferable to rotate the respective blocks 102, 103, 129, and 130 and inspect the characteristics of the gyro sensors.

Therefore, an inspection tray, having grooves into which the respective blocks 102, 103, 129, and 130 can be fitted and capable of being placed on a turntable of an inspection device to be rotated, is prepared. The respective sensors 104, 105, 131, and 132 can be inspected by rotating, by the turntable, the inspection tray on which the respective blocks 102, 103, 129, and 130 are mounted.

Specifically, a first step is performed in a step S200. In the first step, the blocks 102, 103, 129, and 130, in which the sensors 104, 105, 131, and 132 are respectively disposed, are prepared. As each of the sensors 104, 105, 131, and 132, a sensor is prepared, the sensor being configured as a single-axis gyro sensor that has a main-axis disposed parallel to the Z-axis and detects, as an inertial force, an angular velocity around the Z-axis.

As the blocks 102, 103, 129, and 130, those having the shape illustrated in FIG. 3 are prepared. As the blocks 102, 103, 129, and 130, those having the same shape are prepared.

At this stage, the blocks 102, 103, 129, and 130 are not distinguished like the first block 102 and the second block 103. Simply, multiple ones, in which the sensors 104, 105, 131, 132, and the like are mounted on the blocks 102, 103, 129, and 130, are prepared.

Figure 12:
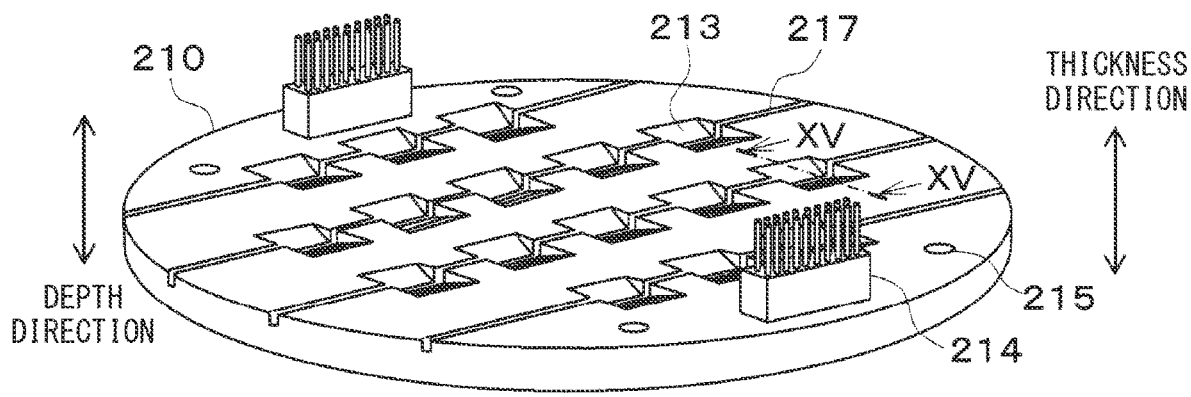
FIG. 12 is a perspective view of a first other-axis tray.
Figure 13:
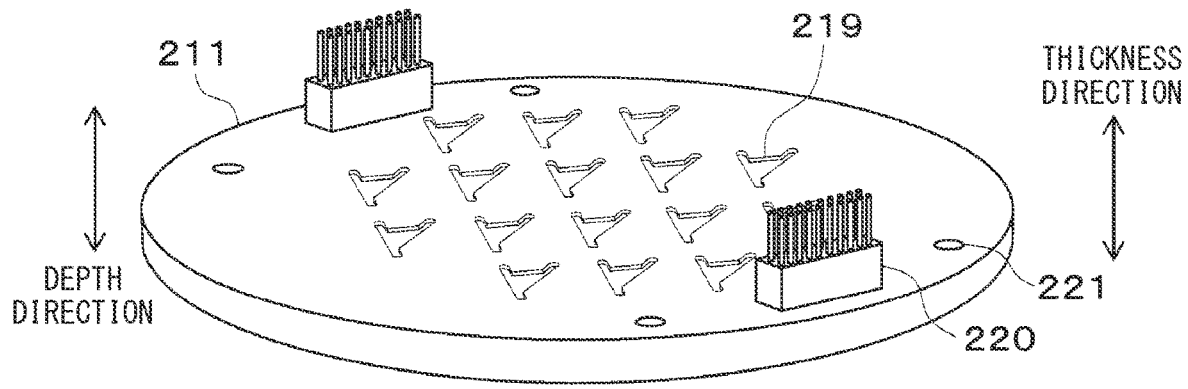
FIG. 13 is a perspective view of a second other-axis tray.
Figure 14:
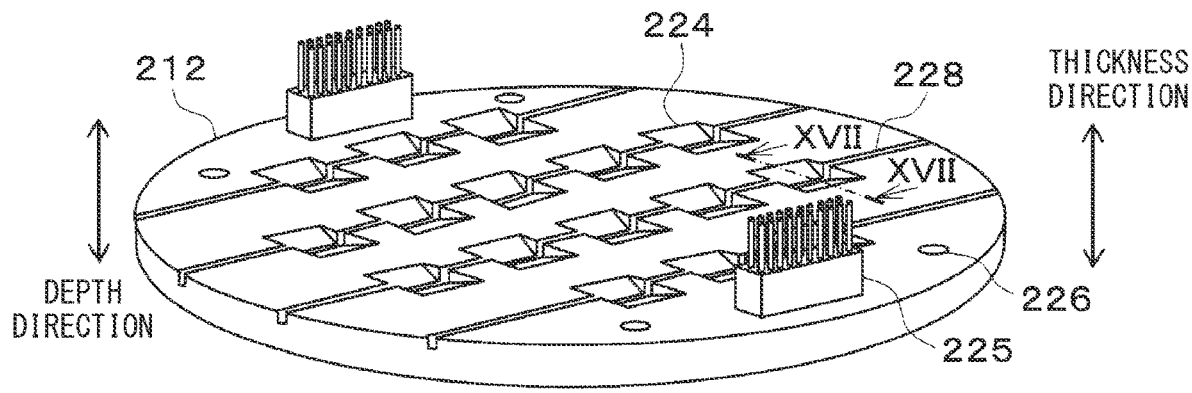
FIG. 14 is a perspective view of a main-axis tray.

In a step S201, a second step is performed. In the second step, a first other-axis tray 210, a second other-axis tray 211, and a main-axis tray 212 that are illustrated in FIG. 12 to FIG. 14 are prepared as the inspection tray. Each of the trays 210 to 212 has, for example, a disk shape.

Figure 15:
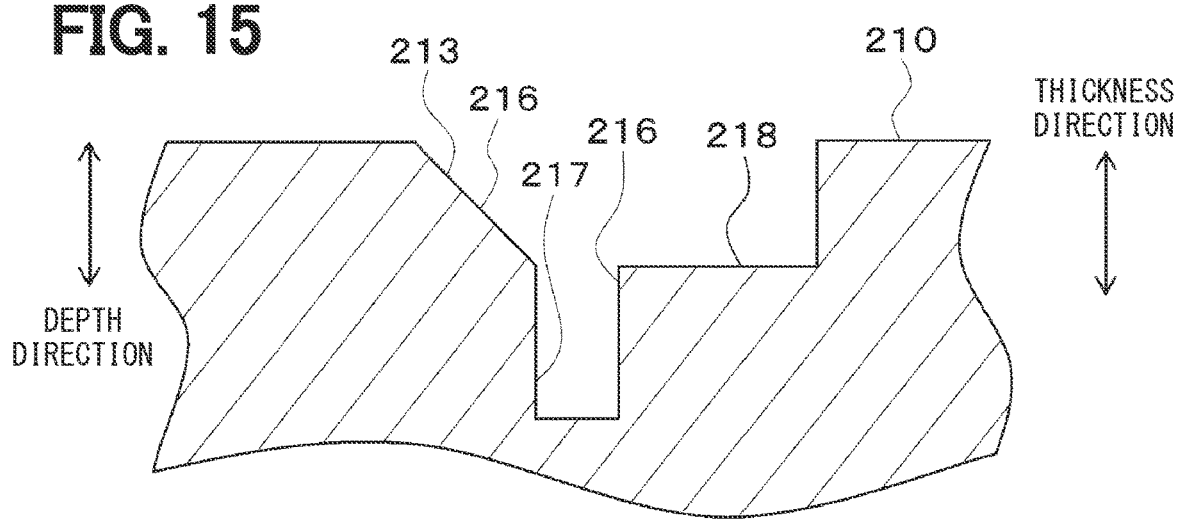
FIG. 15 is a cross-sectional view taken along line XV-XV of FIG. 12.

As illustrated in FIG. 12, the first other-axis tray 210 has a plurality of first other-axis groove portions 213, wiring sockets 214, and screw holes 215. The plurality of first other-axis groove portions 213 correspond to the sensitivity in the X-axis. As illustrated in FIG. 15, the plurality of first other-axis groove portions 213 have first other-axis positioning surfaces 216, cutout grooves 217, and stepped grooves 218.

The first other-axis positioning surfaces 216 are surfaces with which the respective blocks 102, 103, 129, and 130 are in contact. The first other-axis positioning surfaces 216 are surfaces for positioning such that the thickness direction of the first other-axis tray 210, corresponding to the depth direction of the first other-axis groove portion 213, is parallel to the first other-axes of the sensors 104, 105, 131, and 132.

The cutout groove 217 configures a space portion in which, for example, a corner portion configured by the inclined surface 107 and the side surfaces 110 and 111 of the first block 102 is disposed. The same applies to the second to fourth blocks 103, 129, and 130. The stepped groove 218 configures a space portion for preventing the electronic components 117 and the respective sensors 104, 105, 131, and 132 on the respective inclined surfaces 107, 112, 133, and 138 from coming into contact with the wall surfaces of the first other-axis groove portions 213. As illustrated in FIG. 12, the cutout groove 217 reaches the outer edge of the first other-axis tray 210. The shape of the cutout groove 217 is an example, and the cutout groove may not reach the outer edge of the first other-axis tray 210. The screw hole 215 is a hole for screw fixing.

Figure 16:
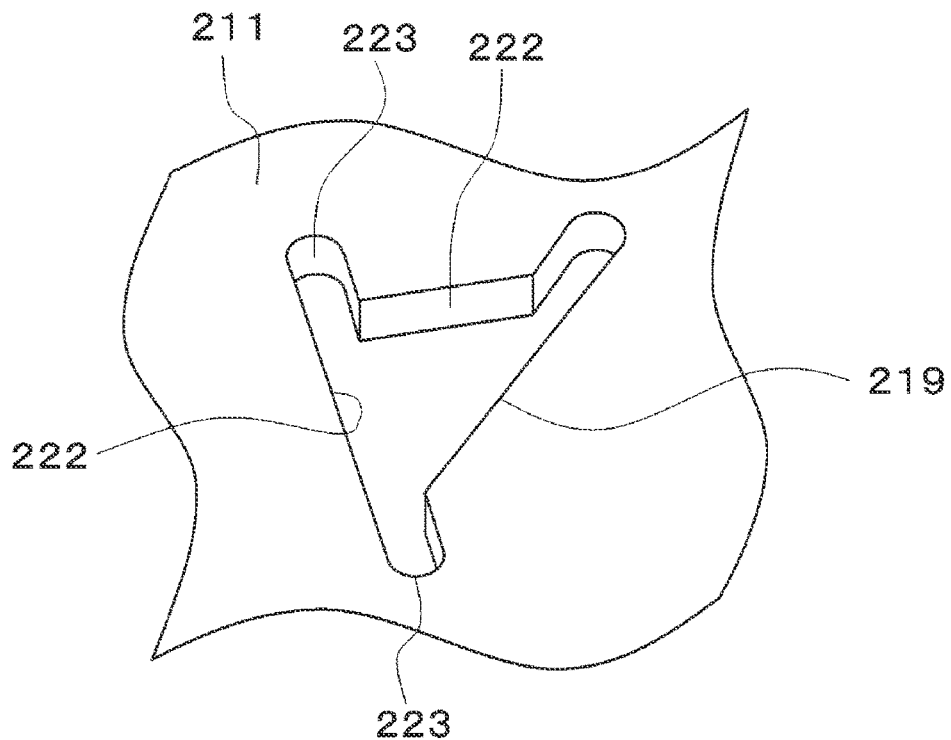
FIG. 16 is a perspective view of a first other-axis groove portion illustrated in FIG. 13.

As illustrated in FIG. 13, the second other-axis tray 211 has a plurality of second other-axis groove portions 219, wiring sockets 220, and screw holes 221. The plurality of second other-axis groove portions 219 correspond to the sensitivity in the Y-axis. As illustrated in FIG. 16, the plurality of second other-axis groove portions 219 have second other-axis positioning surfaces 222 and cutout grooves 223.

The second other-axis positioning surfaces 222 are surfaces with which the respective blocks 102, 103, 129, and 130 are in contact. The second other-axis positioning surface 222 is a surface for positioning such that the thickness direction of the second other-axis tray 211, corresponding to the depth direction of the second other-axis groove portion 219, is parallel to the second other-axes of the sensors 104, 105, 131, and 132.

The cutout groove 223 configures a space portion in which, for example, a corner portion configured by the inclined surface 107 and the side surfaces 110 and 111 of the first block 102 and a corner portion configured by one side surface 110 and the other side surface 111 are disposed. The same applies to the second to fourth blocks 103, 129, and 130. The screw hole 221 is a hole for screw fixing.

Figure 17:
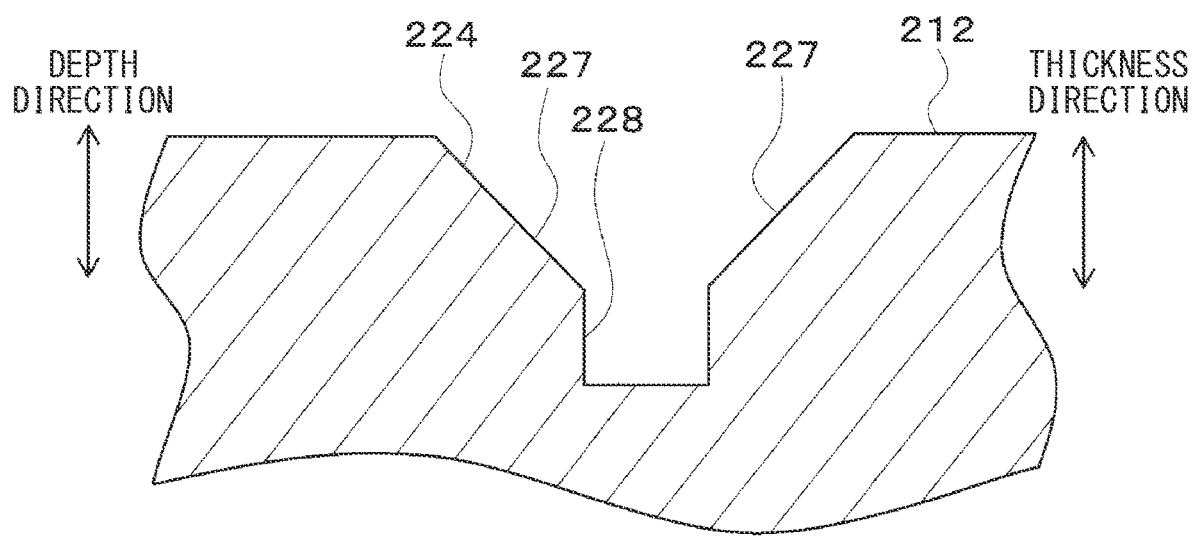
FIG. 17 is a cross-sectional view taken along line XVII-XVII of FIG. 14.

As illustrated in FIG. 14, the main-axis tray 212 has a plurality of main-axis groove portions 224, wiring sockets 225, and screw holes 226. The plurality of main-axis groove portions 224 correspond to the sensitivity in the Z-axis. As illustrated in FIG. 17, the plurality of main-axis groove portions 224 have main-axis positioning surfaces 227 and cutout grooves 228.

The main-axis positioning surfaces 227 are surfaces with which the respective blocks 102, 103, 129, and 130 are in contact. The main-axis positioning surfaces 227 are surfaces for positioning such that the thickness direction of the main-axis tray 212, corresponding to the depth direction of the main-axis groove portion 224, is parallel to the main-axes of the sensors 104, 105, 131, and 132.

The cutout groove 228 configures a space portion in which a corner portion configured by the respective side surfaces 110 and 111 of the first block 102 is disposed. As illustrated in FIG. 14, the cutout groove 228 reaches the outer edge of the main-axis tray 212. The shape of the cutout groove 228 is an example, and the cutout groove may not reach the outer edge of the main-axis tray 212. The screw hole 226 is a hole for screw fixing.

The respective trays 210 to 212 fix the blocks 102, 103, 129, and 130 corresponding to the respective groove portions 213, 219, and 224 and have non-illustrated wiring mechanism that are attachments for drawing out wiring. The wiring are drawn out from the respective wiring mechanisms and electrically connected to the respective wiring sockets 214, 220, and 225.

Each of the trays 210 to 212 is made of metal or resin. Each of the groove portions 213, 219, and 224 is formed by, for example, machining. In the case where each of the trays 210 to 212 is made of resin, each of the groove portions 213, 219, and 224 may be formed by resin molding.

In a step S202 and a step S203, a third step is performed. In the third step, the blocks 102, 103, 129, and 130 are fitted into any one of the respective trays 210 to 212.

Figure 18:
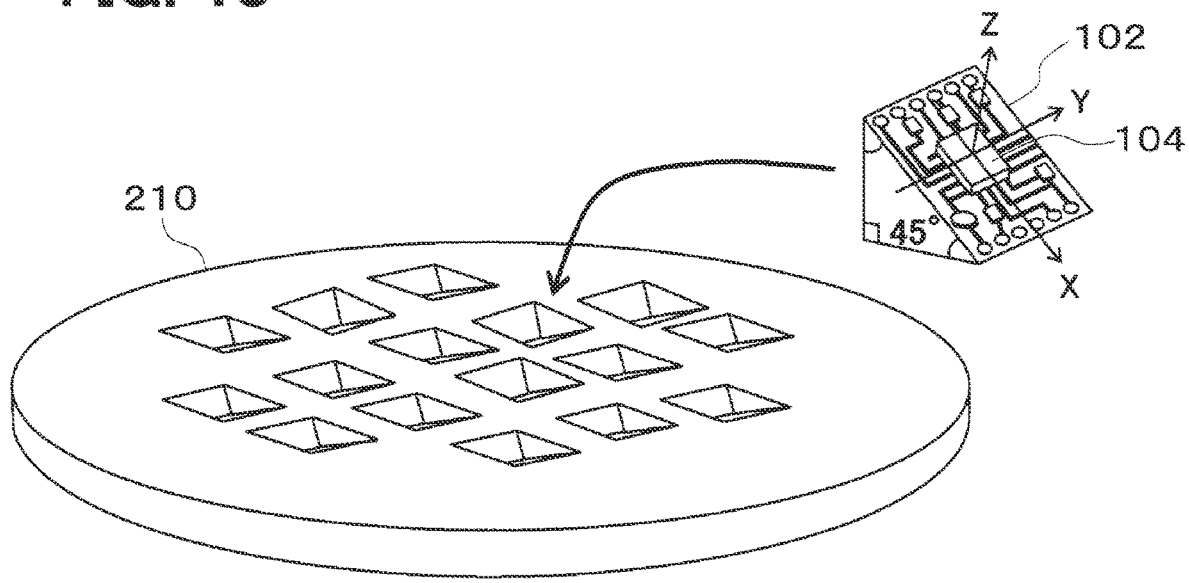
FIG. 18 is a view illustrating a state where blocks are fitted into an inspection tray.
Figure 19:
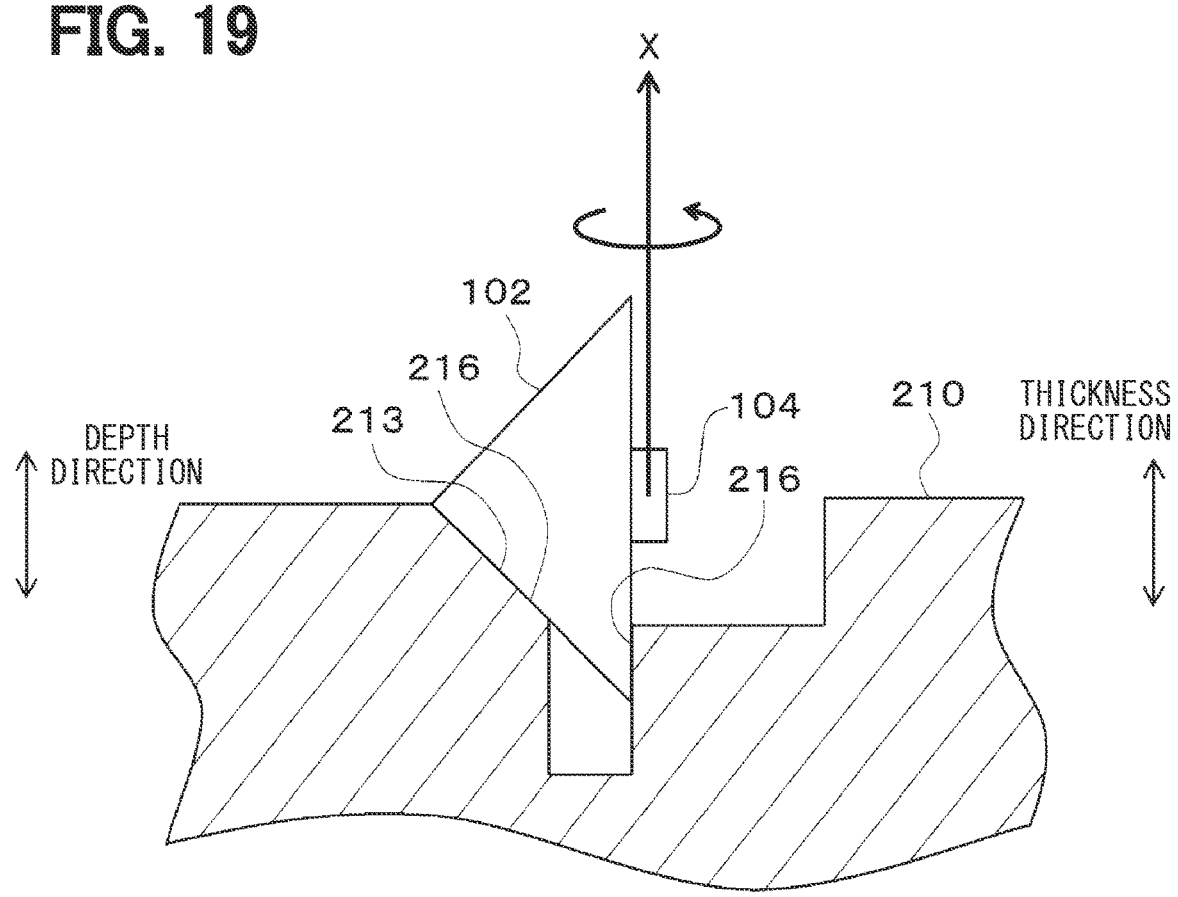
FIG. 19 is a partial cross-sectional view illustrating a state where a block is fitted into the first other-axis groove portion.

In the step S202, the plurality of blocks 102, 103, 129, and 130 are fitted into the respective first other-axis groove portions 213 of the first other-axis tray 210, as illustrated in FIG. 18. As illustrated in FIG. 19, the plurality of blocks 102, 103, 129, and 130 are brought into contact with the first other-axis positioning surfaces 216 of the respective first other-axis groove portions 213. As a result, the thickness direction of the first other-axis tray 210 and the first other-axes of the sensors 104, 105, 131, and 132 are disposed in parallel.

In the step S203, after the plurality of blocks 102, 103, 129, and 130 are positioned by being fitted into the respective first other-axis groove portions 213, the respective blocks 102, 103, 129, and 130 are electrically connected to the respective wiring mechanisms. As a result, the first other-axis tray 210 is electrically connected to the plurality of blocks 102, 103, 129, and 130.

Figure 20:
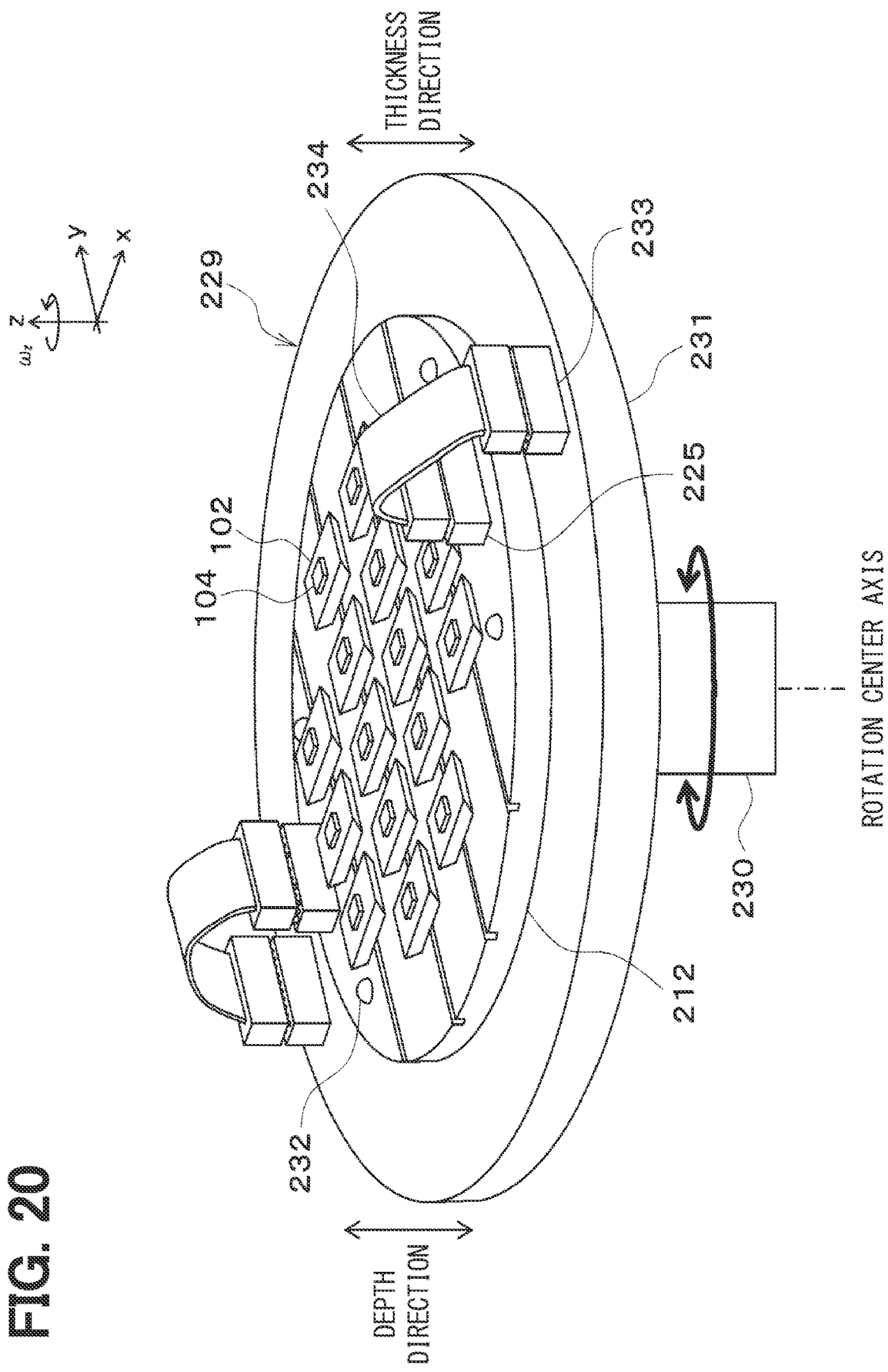
FIG. 20 is a perspective view illustrating a part of an inspection device according to the first embodiment.

In a step S204, a fourth step is performed. In the fourth step, an inspection device 229 is prepared as illustrated in FIG. 20.

The inspection device 229 includes a rotating shaft 230, a turntable 231, and a non-illustrated control device. One end side of the rotating shaft 230 supports the turntable 231. The other end side of the rotating shaft 230 is housed in a non-illustrated rotation mechanism. The rotation mechanism is controlled by the control device.

The turntable 231 is a disk-shaped base on which each of the trays 210 to 212 is mounted. Each of the trays 210 to 212 is disposed at the axial center of the turntable 231 and is fixed by screws 232. FIG. 20 illustrates a state where the main-axis tray 212 is fixed to the turntable 231.

In addition, the turntable 231 has wiring connection parts 233. The wiring connection part 233 is connected to each of the wiring sockets 214, 220, and 225 of the respective trays 210 to 212 via inspection wiring 234. As a result, each of the trays 210 to 212 and the turntable 231 are electrically connected.

The wiring connection part 233 is electrically connected to the control device of the inspection device 229. The wiring connection part 233 is connected to an inspection part of the inspection device 229 through the inside of the turntable 231 and the inside of the rotating shaft 230. During the rotation of the rotating shaft 230, the wiring and the inspection part are electrically connected by a slip ring. Therefore, the wiring for inspection is not entangled by the rotation of the turntable 231. Note that wireless communication may be adopted instead of the slip ring.

Then, the first other-axis tray 210 is installed on the turntable 231 by the screws 232. As a result, the central axis of rotation of the turntable 231 and the thickness direction of the first other-axis tray 210 are disposed in parallel, and the central axis of rotation of the turntable 231 and the first other-axes of the respective sensors 104, 105, 131, and 132 are disposed in parallel.

In a step S205 and a step S206, a fifth step is performed. In the fifth step, the sensitivities of the respective sensors 104, 105, 131, and 132 are inspected.

In the step S205, the turntable 231 is pivoted or swung to measure the characteristics in the three axes. The pivoting includes both rotation in one direction and rotation in the opposite direction. As a result, the sensitivities, in the main-axes, the first other-axes, and the second other-axes, of multiple sensors 104, 105, 131, and 132, the scale factors, the non-linearity, and the like are simultaneously inspected.

In a case where the inspection device 229 includes a thermostatic bath equipment, the characteristics of the respective sensors 104, 105, 131, and 132 can be measured in a state where temperature is applied to the respective sensors 104, 105, 131, and 132. Therefore, the temperature characteristics of the sensitivities can be evaluated, etc.

In the step S206, the first other-axis tray 210 is removed from the turntable 231. The respective blocks 102, 103, 129, and 130 are removed from the first other-axis groove portions 213 of the first other-axis tray 210.

In a step S207, it is determined whether measurement has been performed for the three types of trays 210 to 212. When the measurement for the three types of trays 210 to 212 is not completed, the process returns to the step S202. Since the measurement for the second other-axis tray 211 and the main-axis tray 212 is not completed, the process returns to the step S202.

Figure 21:
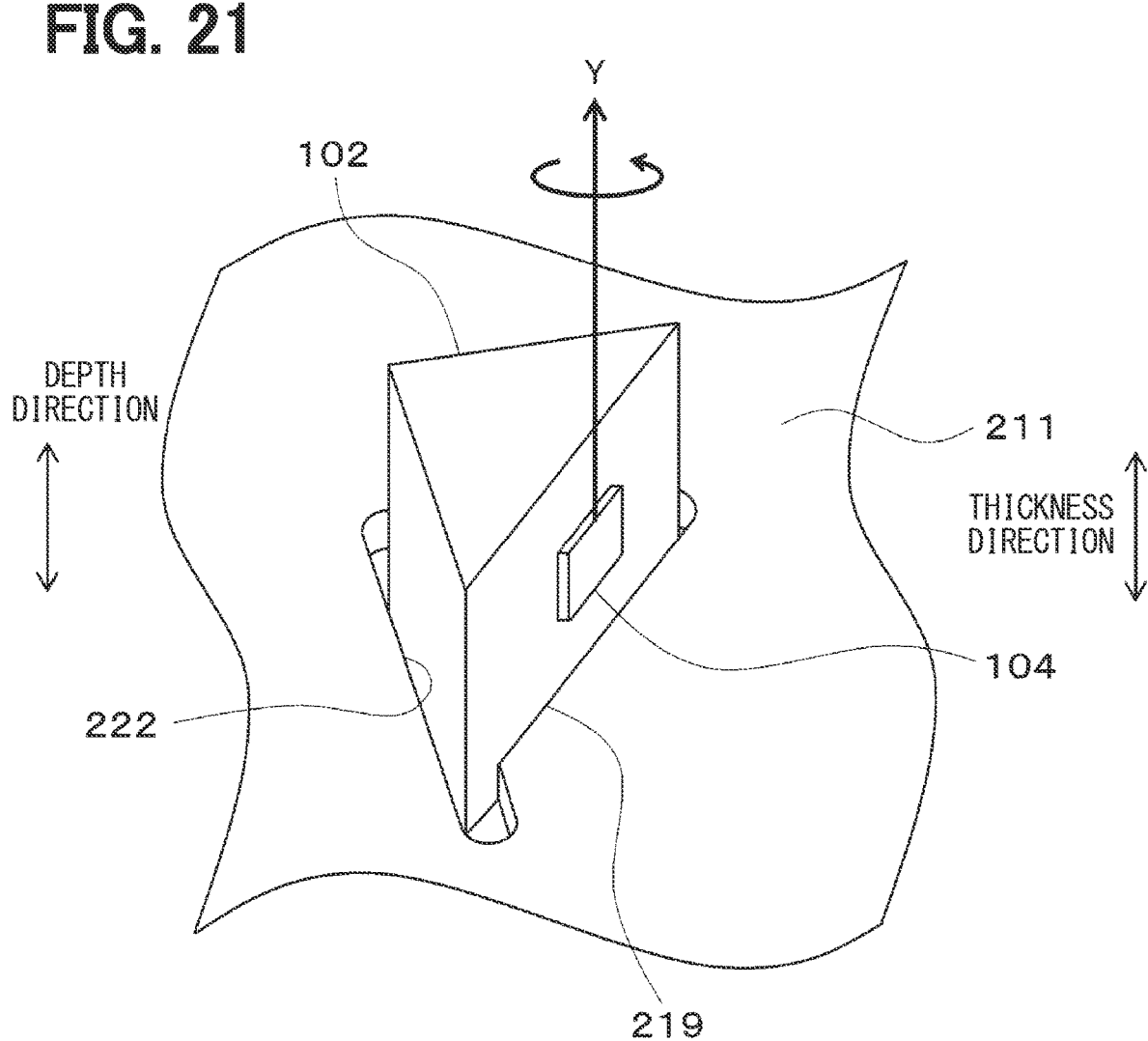
FIG. 21 is a partial cross-sectional view illustrating a state where a block is fitted into a second other-axis groove portion.

In the step S202 and the S203, the plurality of blocks 102, 103, 129, and 130 are fitted into the plurality of second other-axis groove portions 219 of the second other-axis tray 211. In addition, the plurality of blocks 102, 103, 129, and 130 are brought into contact with the second other-axis positioning surfaces 222 of the respective second other-axis groove portions 219, whereby the thickness direction of the second other-axis tray 211 and the second other-axes of the sensors 104, 105, 131, and 132 are disposed in parallel, as illustrated in FIG. 21. The respective blocks 102, 103, 129, and 130 and the respective wiring mechanisms of the second other-axis tray 211 are electrically connected.

Subsequently, in the step S204, the second other-axis tray 211 is installed on the turntable 231. As a result, the central axis of rotation of the turntable 231 and the thickness direction of the second other-axis tray 211 are disposed in parallel, and the central axis of rotation of the turntable 231 and the second other-axes of the respective sensors 104, 105, 131, and 132 are disposed in parallel.

In the step S205 and the step S206, the turntable 231 is pivoted or swing to inspect the sensitivities and the like, in the second other-axes, of the respective sensors 104, 105, 131, and 132. In addition, the second other-axis tray 211 is removed from the turntable 231.

Then, in the step S207, the measurement for the main-axis tray 212 is not completed, so that the process returns to the step S202 again.

Figure 22:
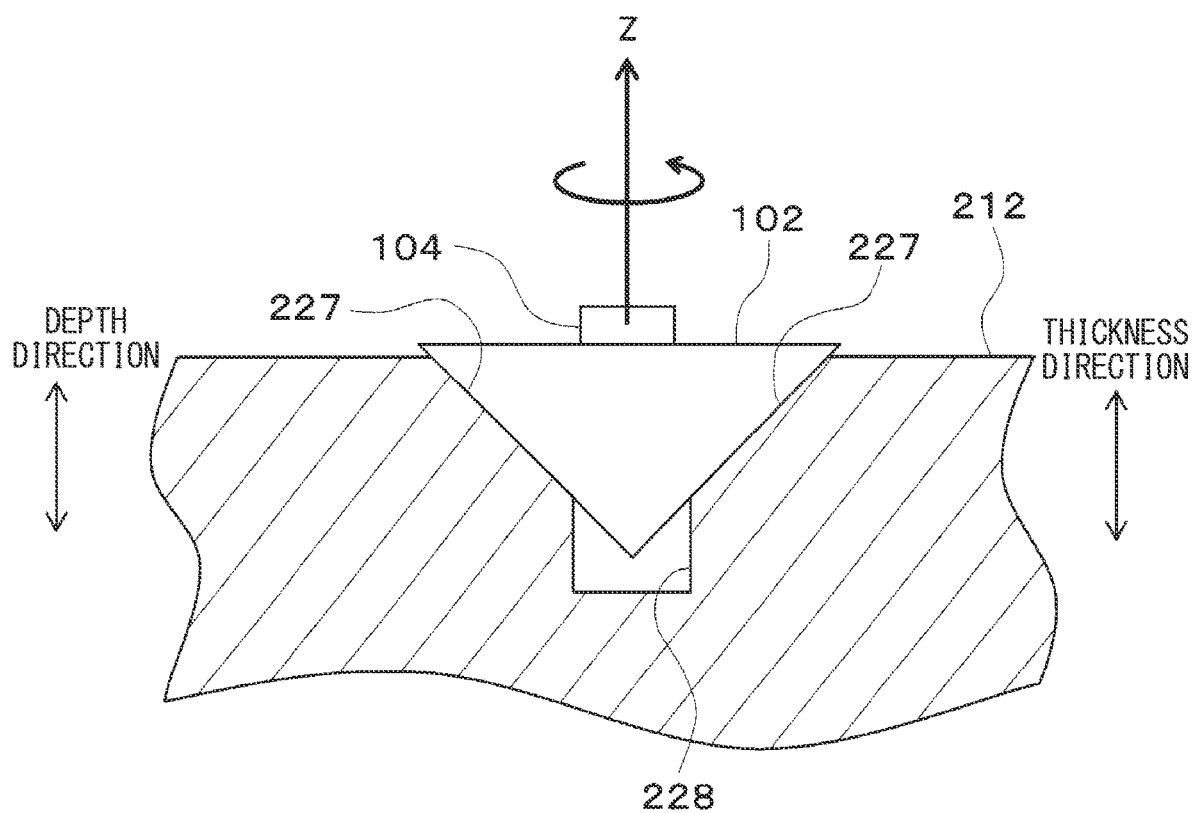
FIG. 22 is a partial cross-sectional view illustrating a state where a block is fitted into a main-axis groove portion.

In the step S202 and the S203, the plurality of blocks 102, 103, 129, and 130 are fitted into the respective main-axis groove portions 224 of the main-axis tray 212. In addition, the plurality of blocks 102, 103, 129, and 130 are brought into contact with the main-axis positioning surfaces 227 of the respective main-axis groove portions 224, whereby the thickness direction of the main-axis tray 212 and the main-axes of the sensors 104, 105, 131, and 132 are disposed in parallel, as illustrated in FIG. 22. The respective blocks 102, 103, 129, and 130 and the respective wiring mechanisms of the main-axis tray 212 are electrically connected.

In the step S204, the main-axis tray 212 is installed on the turntable 231. As a result, the central axis of rotation of the turntable 231 and the thickness direction of the main-axis tray 212 are disposed in parallel, and the central axis of rotation of the turntable 231 and the main-axes of the respective sensors 104, 105, 131, and 132 are disposed in parallel.

In the step S205 and the step S206, the turntable 231 is pivoted or swung to inspect the sensitivities and the like, in the main-axes, of the respective sensors 104, 105, 131, and 132. In addition, the main-axis tray 212 is removed from the turntable 231.

Then, in the step S207, the measurement for all the trays 210 to 212 is completed, so that the inspection ends.

In the third step in the step S202 and the step S203, the respective blocks 102, 103, 129, and 130 are fitted into any one of the main-axis tray 212, the first other-axis tray 210, and the second other-axis tray 211, as described above. In the fourth step in the step S204, the tray of the main-axis tray 212, the first other-axis tray 210, and the second other-axis tray 211, into which the plurality of blocks 102, 103, 129, and 130 are fitted, is installed on the turntable 231. Then, in the fifth step in the step S205 and the step S206, the respective sensors 104, 105, 131, and 132 in the inspection tray installed on the turntable 231 are inspected.

As described above, the third step, the fourth step, and the fifth step in the step S202 to the step S206 are repeated, whereby the sensitivities and the like, in the main-axes, the first other-axes, and the second other-axes, of the respective sensors 104, 105, 131, and 132 are inspected.

After the inspection step, an assembly step is performed. The mounting material 101 and the respective blocks 102, 103, 129, and 130 having been inspected are prepared. The respective blocks 102, 103, 129, and 130 are disposed on the installation surface 106 of the mounting material 101. The pedestal 128 is assembled in a state where the respective blocks 102, 103, 129, and 130 are disposed point-symmetrically with respect to a reference point of the installation surface 106 of the mounting material 101 and the relative positions are positioned by the positioning portions 127. Thus, the multi-axial inertial force sensor 100 is completed.

In the present embodiment, the pedestal 128 is configured with the respective blocks 102, 103, 129, and 130 assembled, as described above. Since the accuracies of the relative positions of the respective sensors 104, 105, 131, and 132 are secured by the positioning portions 127 of the respective blocks 102, 103, 129, and 130, the axis orthogonality of the respective sensors 104, 105, 131, and 132 can be specified with high accuracy. Therefore, the orthogonality of the main-axes of the respective sensors 104, 105, 131, 132 can be secured.

The axis orthogonality of the respective sensors 104, 105, 131, and 132 is also secured in the state of the pedestal 128. That is, the axis orthogonality of the respective sensors 104, 105, 131, and 132 is ensured by the machining accuracies of the respective blocks 102, 103, 129, and 130. Therefore, it is not necessary, after the sensitivities of the respective sensors 104, 105, 131, and 132 are inspected in units of each of the blocks 102, 103, 129, and 130 before the pedestal 128 is assembled, to again inspect the sensitivities of the respective sensors 104, 105, 131, and 132 in the state of the pedestal 128. For example, after the pedestal 128 is assembled, an inspection value obtained for each of the blocks 102, 103, 129, and 130 is substituted into the value of a matrix operator, whereby algorithm can be adjusted. Therefore, man-hours in the inspection step can be reduced.

Further, in the inspection step, inspection can be performed in units of each of the blocks 102, 103, 129, and 130. Therefore, it is not necessary to perform an inspection in a state of being assembled to the pedestal 128, and it is also not necessary to provide a large device for performing an inspection in units of the pedestal 128. Not only the cost of the inspection step but also the cost of the device can be reduced. As a result, the multi-axial inertial force sensor 100 can be provided at a low cost.

As a modification, the sensitivities and the like, in at least only the main-axes, of the respective sensors 104, 105, 131, and 132 may be inspected in the inspection step.

As a modification, the shapes of the respective groove portions 213, 219, and 224 are not the shapes illustrated in FIG. 15 to FIG. 17, and may be other shapes. The sensitivities and the like in all the axes of the main-axis, the first other-axis, and the second other-axis may be inspected with the shape of one groove. In this case, only one inspection tray is required. Further, the inspection tray is not limited to what has a disk shape, and may have another shape such as a rectangular plate.

As a modification, a sensor configured as a single-axis acceleration sensor may be prepared as each of the sensors 104, 105, 131, and 132 in the first step. The single-axis acceleration sensor is configured such that the main-axis is disposed parallel to the Z-axis and an acceleration in the Z-axis direction is detected as the inertial force. The mounting of the respective sensors 104, 105, 131, and 132 on the respective blocks 102, 103, 129, and 130 is the same as the method illustrated in FIG. 4. In a case where the number of the sensors 104, 105, 131, and 132 is four, a three-axis acceleration sensor is configured. Similarly to the above, accelerations in three axes of the x-axis, the y-axis, and the z-axis can be detected.

Figure 23:
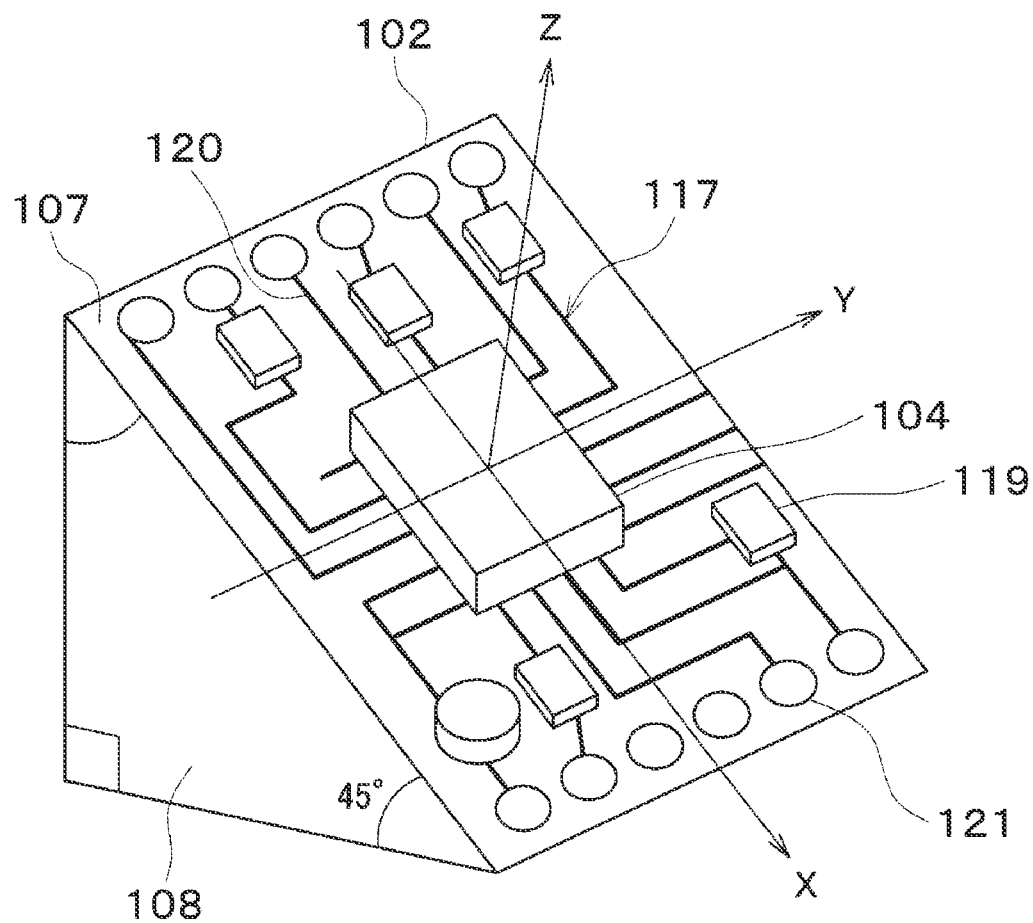
FIG. 23 is a view illustrating a modification of each block according to the first embodiment.

As a modification, the first sensor 104, the external component 119, the external wiring 120, and the draw-out part 121 may be directly mounted on the inclined surface 107 of the first block 102, as illustrated in FIG. 23. In this case, the mounting substrate 118 is not included in the electronic component 117. The same applies to the second to fourth blocks 103, 129, and 130. Each of the blocks 102, 103, 129, and 130 is manufactured by injection molding of a thermoplastic resin. The external wiring 120 and an electrode are formed by a molded interconnect device (MID) method. In short, the respective blocks 102, 103, 129, and 130 also serve as the mounting substrate 118.

Figure 24:
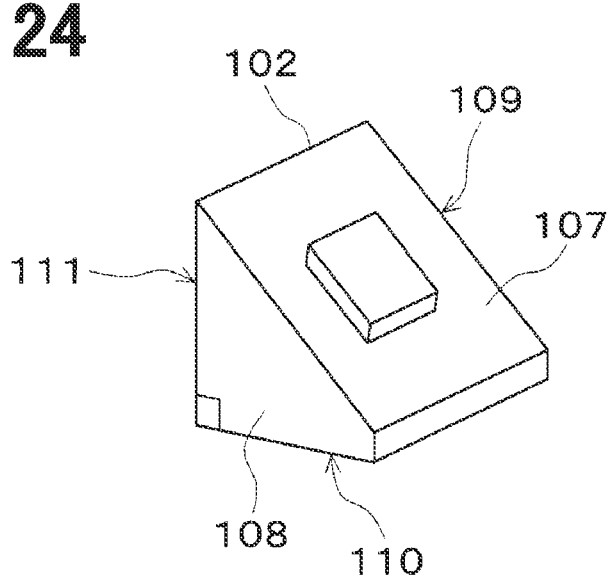
FIG. 24 is a view illustrating a modification of each block according to the first embodiment.

As a modification, the first block 102 may have a shape in which the tip of a corner portion configured by the inclined surface 107 and one side surface 110 is chamfered, as illustrated in FIG. 24. The same applies to the second to fourth blocks 103, 129, and 130.

Figure 25:
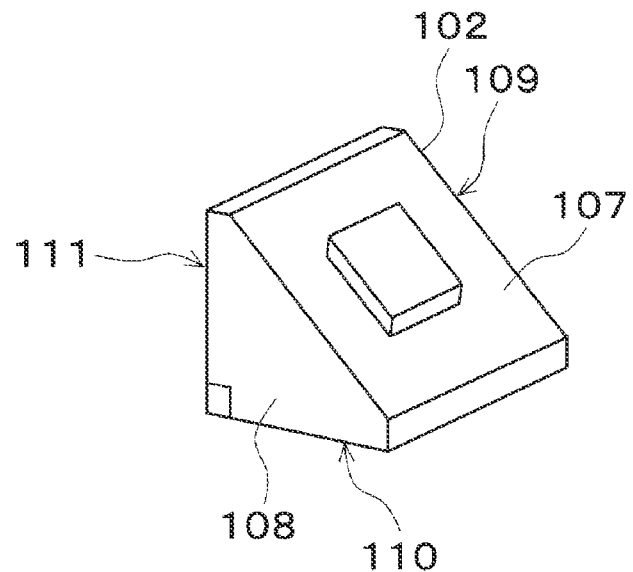
FIG. 25 is a view illustrating a modification of each block according to the first embodiment.

As a modification, the first block 102 may have a shape in which tips of two corner portions configured by the inclined surface 107 and the respective side surfaces 110 and 111 are chamfered, as illustrated in FIG. 25. The same applies to the second to fourth blocks 103, 129, and 130.

Figure 26:
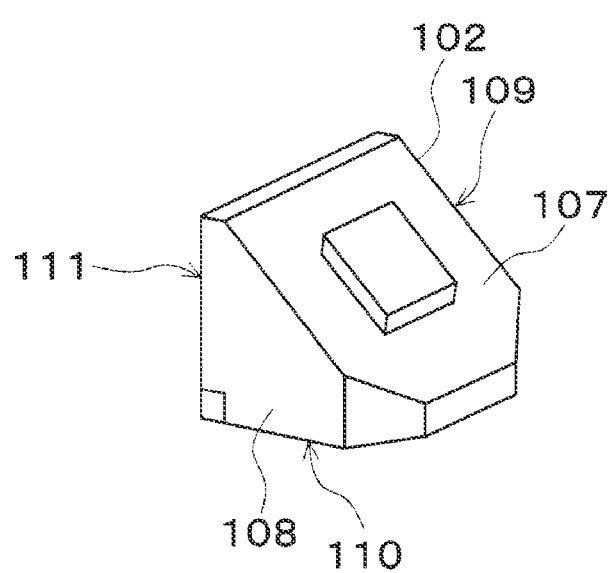
FIG. 26 is a view illustrating a modification of each block according to the first embodiment.

As a modification, in the shape of the first block 102 illustrated in FIG. 25, a shape, in which a corner portion configured by the inclined surface 107, the one end surface 108, and the one side surface 110 is chamfered as illustrated in FIG. 26, may be adopted. In addition, the first block 102 may have a shape in which a corner portion configured by the inclined surface 107, the other end surface 109, and the one side surface 110 is chamfered. The same applies to the second to fourth blocks 103, 129, and 130.

Second Embodiment

Figure 27:
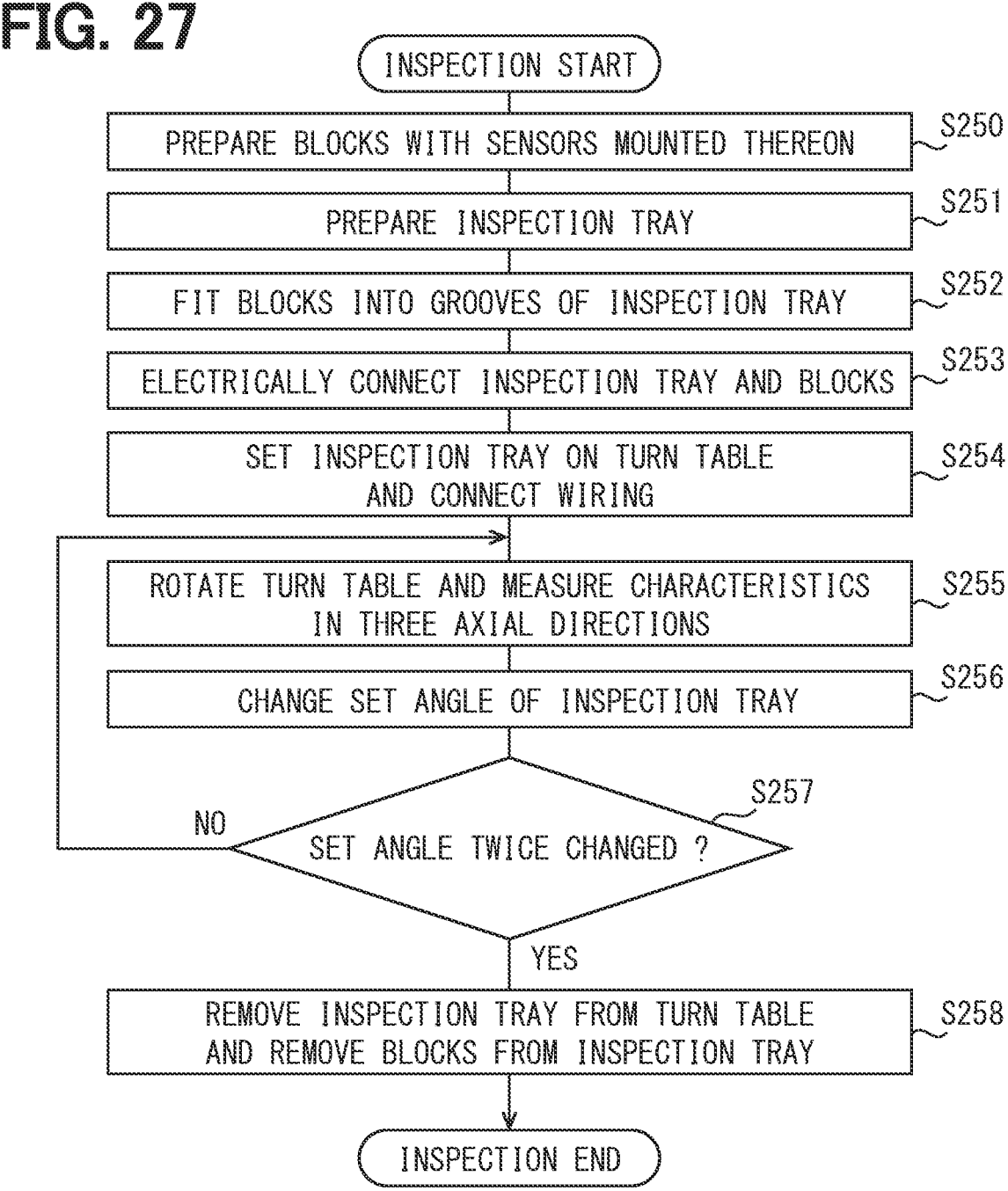
FIG. 27 is a flowchart showing an inspection step according to a second embodiment.

In the present embodiment, differences from the first embodiment will be mainly described. In the present embodiment, an inspection step is performed according to the flowchart illustrated in FIG. 27.

In a step S250, a first step is performed similarly to the step S200. That is, the plurality of blocks 102, 103, 129, and 130 on which the sensors 104, 105, 131, and 132 and the like are mounted are prepared.

In a step S251, a second step is performed similarly to the step S201. In the second step, the main-axis tray 212 illustrated in FIG. 14 is prepared as the inspection tray. Note that, as the inspection tray, the first other-axis tray 210 or the second other-axis tray 211 may be prepared.

In a step S252 and a step S253, a third step is performed similarly to the step S202 and the step S203. In the step S252, the plurality of blocks 102, 103, 129, and 130 are fitted into the respective main-axis groove portions 224 of the main-axis tray 212. As a result, the thickness direction of the main-axis tray 212 and the main-axes of the sensors 104, 105, 131, and 132 are disposed in parallel.

In the step S253, after the plurality of blocks 102, 103, 129, and 130 are positioned by being fitted into the respective main-axis groove portions 224, the respective blocks 102, 103, 129, and 130 and the respective wiring mechanisms are electrically connected. As a result, the main-axis tray 212 and the plurality of blocks 102, 103, 129, and 130 are electrically connected.

Figure 28:
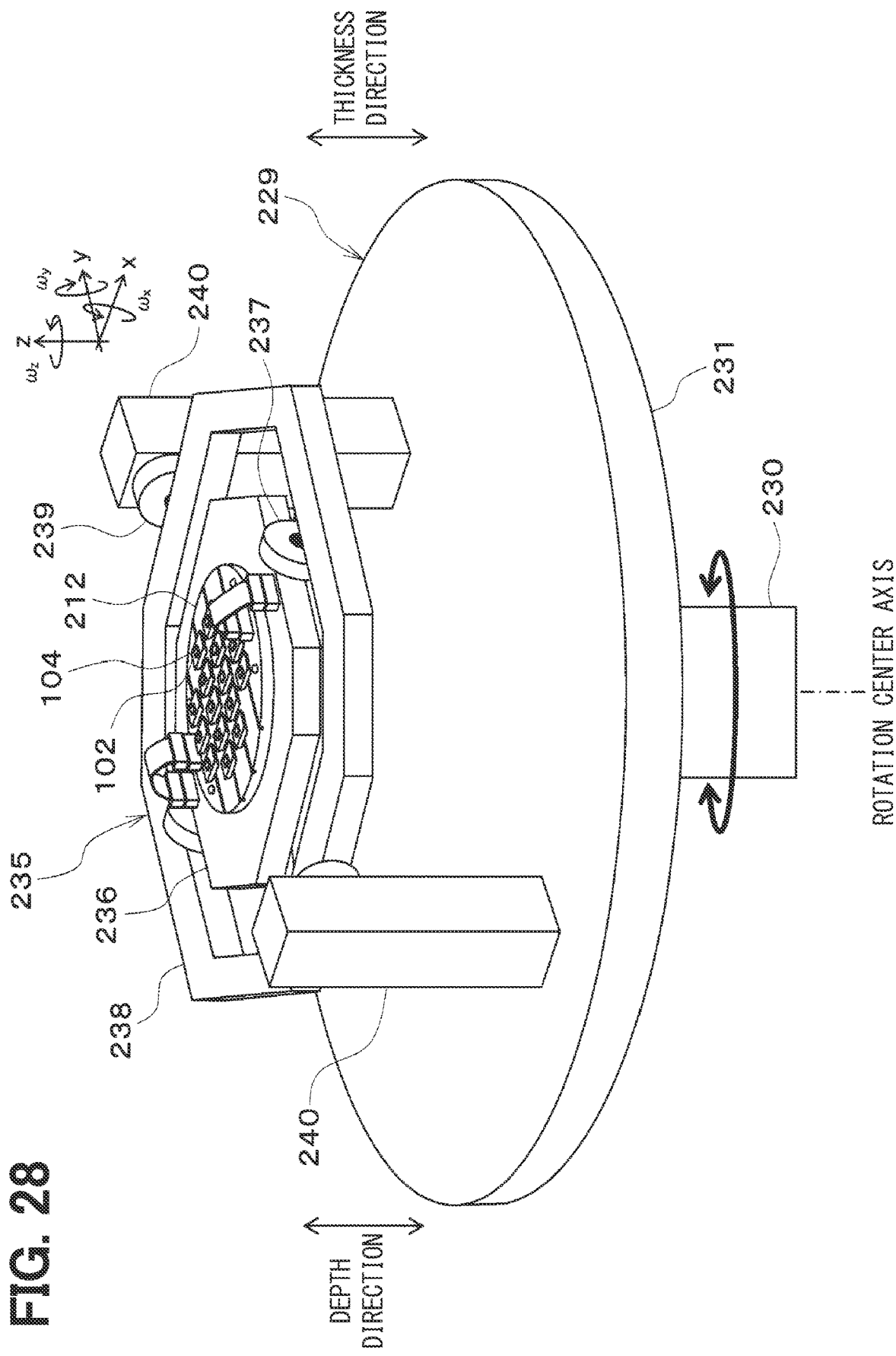
FIG. 28 is a perspective view illustrating a part of an inspection device according to the second embodiment.

In a step S254, a fourth step is performed similarly to the step S204. In the fourth step, the inspection device 229 is prepared, and what has a gimbal mechanism 235 is prepared as the turntable 231, as illustrated in FIG. 28.

The gimbal mechanism 235 is a rotating table that rotates an object about one axis. The gimbal mechanism 235 according to the present embodiment is configured such that two axes are orthogonal. The gimbal mechanism 235 has a table 236. The table 236 is supported by two opposing x-axis rotating shafts 237 and is mechanically connected to a support frame 238. The support frame 238 is supported by two opposing y-axis rotating shafts 239 and is mechanically connected to support columns 240. The support columns 240 are fixed to the turntable 231.

Then, the main-axis tray 212 is screw fixed to the table 236. As a result, the central axis of rotation of the turntable 231 and the thickness direction of the main-axis tray 212 are disposed in parallel, and the central axis of rotation of the turntable 231 and the main-axes of the plurality of sensors 104, 105, 131, and 132 are disposed in parallel. Similarly to the first embodiment, the respective blocks 102, 103, 129, and 130 and the respective wiring mechanisms are electrically connected.

According to the above turntable 231, the table 236 can be rotated about the x-axis and the y-axis. In addition, the main-axis tray 212 can be positioned by being rotated by 90° about the x-axis and the y-axis. For example, the turntable 231 can be rotated or swung in a state where the main-axis tray 212 is fixed by being rotated by 90° about the x-axis. By using the above turntable 231, the sensors 104, 105, 131, and 132 can be rotated in all directions of the main-axis, the first other-axis, and the second other-axis without changing the main-axis tray 212. This eliminates the trouble of replacing the main-axis tray 212.

In a step S255, a fifth step is performed similarly to the step S205. In the step S205, the turntable 231 is pivoted or swung to simultaneously inspect the sensitivities, in the x-axes, the first other-axes, and the second other-axes, of multiple sensors 104, 105, 131, and 132, the scale factors, the non-linearity, and the like.

In a step S256, the installation angle of the main-axis tray 212 is changed. The table 236 of the gimbal mechanism 235 is rotated by 90° about the x-axis using the x-axis rotating shafts 237. As a result, for example, the central axis of rotation of the turntable 231 and a direction orthogonal to the thickness direction of the main-axis tray 212 are disposed in parallel, and the central axis of rotation of the turntable 231 and the first other-axes of the respective sensors 104, 105, 131, and 132 are disposed in parallel.

In a step S257, it is determined whether the installation angle of the table 236 of the gimbal mechanism 235 has been changed twice. When the installation angle of the table 236 has not been changed twice, the process returns to the step S255. Since the measurement mainly for the first other-axis and the second other-axis is not completed, the process returns to the step S255.

Therefore, the step S255 to the step S257 are repeated. As a result, in a state where the central axis of rotation of the turntable 231 and the first other-axes of the plurality of sensors 104, 105, 131, and 132 are disposed in parallel by the gimbal mechanism 235, the sensitivities and the like, in the three axes, of multiple sensors 104, 105, 131, and 132 are simultaneously inspected.

In addition, the table 236 of the gimbal mechanism 235 is returned to the original position, and is rotated by 90° about another axis. The installation angle of the table 236 is changed for the second time. As a result, the central axis of rotation of the turntable 231 and a direction orthogonal to the thickness direction of the main-axis tray 212 are disposed in parallel, and the central axis of rotation of the turntable 231 and the second other-axes of the respective sensors 104, 105, 131, and 132 are disposed in parallel. Then, in a state where the central axis of rotation of the turntable 231 and the second other-axes of the plurality of sensors 104, 105, 131, and 132 are disposed in parallel by the gimbal mechanism 235, the sensitivities, in the three axes, of multiple sensors 104, 105, 131, and 132 are simultaneously inspected.

Note that, when the step S255 to the step S257 are repeated, any one of the main-axis, the first other-axis, and the second other-axis may be first disposed in parallel to the central axis of rotation of the turntable 231.

When it is determined in the step S257 that the installation angle has been changed twice, the main-axis tray 212 is removed from the table 236 in a step S258. In addition, the respective blocks 102, 103, 129, and 130 are removed from the respective main-axis groove portions 224 of the main-axis tray 212.

After the inspection step, an assembly step is performed similarly to the first embodiment. Thus, the multi-axial inertial force sensor 100 is completed.

As described above, the turntable 231 can be rotated by appropriately rotating the gimbal mechanism 235. As a result, an inspection can be performed for all the three axes of the main-axis and the respective other-axes by using one inspection tray.

As a modification, acceleration sensors may be used as the sensors 104, 105, 131, and 132. In this case, the inspection can be performed by rotating the table 236 and using the gravity of the earth.

Note that the first other-axis tray 210, the second other-axis tray 211, and the main-axis tray 212 of the present embodiment correspond to the inspection tray. The first other-axis groove portions 213, the second other-axis groove portions 219, and the main-axis groove portions 224 correspond to the groove portions. In addition, the first other-axis positioning surfaces 216, the second other-axis positioning surfaces 222, and the main-axis positioning surfaces 227 correspond to the positioning surfaces.

The present disclosure is not limited to the above embodiments, and can be variously modified as follows without departing from the gist of the present disclosure.

For example, each of the sensors 104, 105, 131, and 132 may be configured as a multiple-axis sensor instead of the single-axis sensor.

In addition, the multi-axial inertial force sensor 100 may be configured as a two-axis gyro sensor or acceleration sensor. In this case, the pedestal 128 is configured by the first block 102 and the second block 103.

The number of sensors to be disposed on each of the inclined surfaces 107, 112, 133, and 138 of the respective blocks 102, 103, 129, and 130 is not limited to one. Not only the Z-axis gyro sensor but also a Z-axis acceleration sensor may be disposed in each of the blocks 102, 103, 129, and 130. This also makes it possible to configure a six-axis internal force sensor.

Each of the end surfaces 108 and 109 of the first block 102 may not have a right-angled isosceles triangle shape. That is, the inclined surface 107 of the first block 102 may not be inclined at an angle of 45° with respect to the installation surface 106 of the mounting material 101.

The respective inclined surfaces 107, 112, 133, and 138 of the respective blocks 102, 103, 129, and 130 have only to be inclined with respect to the installation surface 106. Therefore, the respective blocks 102, 103, 129, and 130 may have a shape in which each of the inclined surfaces 107, 112, 133, and 138 is inclined not only at an acute angle and perpendicularly with respect to the installation surface 106 but also at an obtuse angle. In short, each of the blocks 102, 103, 129, and 130 may be formed in a trapezoidal shape or any shape instead of a triangular prism.

The number of the blocks configuring the pedestal 128 is not limited to 2 or 4, and may be 2 or more. The pedestal 128 may be assembled not only by an even number of blocks but also by an odd number of blocks.

The pedestal 128 may include blocks whose inclined surfaces are oriented in the same direction.

Although the present disclosure has been described in accordance with the embodiments, it is understood that the present disclosure is not limited to the embodiments and the structures. The present disclosure also encompasses various modifications and variations within the scope of equivalents. In addition, various combinations and modes, and other combinations and modes including only one element, more elements, or less elements are also within the scope and idea of the present disclosure.

What is claimed is:

1. A method for manufacturing a multi-axial inertial force sensor that includes a mounting material having an installation surface, a plurality of blocks disposed on the installation surface of the mounting material and having inclined surfaces inclined with respect to the installation surface, and a plurality of sensors disposed on the inclined surfaces of the plurality of blocks, respectively, and configured to detect inertial force corresponding to main-axes, in which the plurality of blocks have a positioning portion that, when the blocks come into contact with at least one or multiple of the plurality of blocks, relatively positions the blocks with respect to a contact partner, and a pedestal is configured with the blocks assembled into a state where the blocks are positioned relative to each other by the positioning portion and a state where the inclined surfaces are oriented in different directions from each other, the method comprising before the pedestal is assembled, an inspection step of inspecting a sensitivity of each of the plurality of sensors disposed in the plurality of blocks respectively, wherein the inspection step includes:

a first step of preparing the plurality of blocks in which the plurality of sensors are disposed respectively;

a second step of preparing a main-axis tray in which a plurality of main-axis groove portions are formed, the plurality of main-axis groove portions having main-axis positioning surfaces with which the plurality of blocks are in contact for positioning such that a thickness direction of the main-axis tray, corresponding to a depth direction of the main-axis groove portions, is parallel to the main-axes of the sensors;

a third step of fitting the plurality of blocks into the plurality of main-axis groove portions of the main-axis tray and bringing the plurality of blocks into contact with the main-axis positioning surfaces of the plurality of main-axis groove portions to dispose the thickness direction of the main-axis tray and the main-axes of the sensors in parallel;

a fourth step of preparing an inspection device including a turntable and installing the main-axis tray on the turntable to dispose a central axis of rotation of the turntable and the thickness direction of the main-axis tray in parallel and to dispose the central axis of rotation of the turntable and the main-axes of the plurality of sensors in parallel; and a fifth step of pivoting or swinging the turntable to inspect the sensitivities, in the main-axes, of the plurality of sensors.

2. The method for manufacturing a multi-axial inertial force sensor according to claim 1, wherein:

an axis perpendicular to the main-axis is defined as a first other-axis, and an axis perpendicular to the main-axis and the first other-axis is defined as a second other-axis;

in the second step, preparing a first other-axis tray in which a plurality of first other-axis groove portions are formed, and a second other-axis tray in which a plurality of second other-axis groove portions are formed, the plurality of first other-axis groove portions having first other-axis positioning surfaces with which the plurality of blocks are in contact for positioning such that a thickness direction of the first other-axis tray, corresponding to a depth direction of the first other-axis groove portions, is parallel to the first other-axes of the sensors, the plurality of second other-axis groove portions having second other-axis positioning surfaces with which the plurality of blocks are in contact for positioning such that a thickness direction of the second other-axis tray, corresponding to a depth direction of the second other-axis groove portions, is parallel to the second other-axes of the sensors;

in the third step, the plurality of blocks are fitted into the plurality of first other-axis groove portions of the first other-axis tray and the plurality of blocks are brought into contact with the first other-axis positioning surfaces of the plurality of first other-axis groove portions to dispose the thickness direction of the first other-axis tray and the first other-axes of the sensors in parallel, and the plurality of blocks are fitted into the plurality of second other-axis groove portions of the second other-axis tray and the plurality of blocks are brought into contact with the second other-axis positioning surfaces of the plurality of second other-axis groove portions to dispose the thickness direction of the second other-axis tray and the second other-axes of the sensors in parallel;

in the fourth step, the first other-axis tray is installed on the turntable to dispose the central axis of rotation of the turntable and the thickness direction of the first other-axis tray in parallel and to dispose the central axis of rotation of the turntable and the first other-axes of the plurality of sensors in parallel, and the second other-axis tray is installed on the turntable to dispose the central axis of rotation of the turntable and the thickness direction of the second other-axis tray in parallel and to dispose the central axis of rotation of the turntable and the second other-axes of the plurality of sensors in parallel;

in the fifth step, the turntable is pivoted or swung to inspect the sensitivities, in the first other-axes, of the plurality of sensors, and the turntable is pivoted or swung to inspect the sensitivities, in the second other-axes, of the plurality of sensors; further in the third step, the plurality of blocks are fitted into one of the main-axis tray, the first other-axis tray, and the second other-axis tray;

in the fourth step, the one of the main-axis tray, the first other-axis tray, and the second other-axis tray, into which the plurality of blocks are fitted, is installed on the turntable; and the third step, the fourth step, and the fifth step are repeated to inspect the sensitivities, in the main-axes, the first other-axes, and the second other-axes, of the plurality of sensors.

3. The method for manufacturing a multi-axial inertial force sensor according to claim 1, comprising, after the inspection step, an assembly step of disposing the plurality of blocks on the installation surface of the mounting material and disposing the plurality of blocks point-symmetrically with respect to a reference point of the installation surface of the mounting material to assemble the pedestal.

4. The method for manufacturing a multi-axial inertial force sensor according to claim 1, wherein
a direction perpendicular to the inclined surface is defined as a Z-axis, and
in the first step, the plurality of sensors are configured as single-axis gyro sensors having the main-axes disposed in parallel to the Z-axis so as to detect, as the inertial force, an angular velocity around the Z-axis.

5. The method for manufacturing a multi-axial inertial force sensor according to claim 1, wherein
a direction perpendicular to the inclined surface is defined as a Z-axis, and
in the first step, the plurality of sensors are configured as single-axis acceleration sensors having the main-axes disposed in parallel to the Z-axis so as to detect, as the inertial force, an acceleration in a Z-axis direction.

6. The method for manufacturing a multi-axial inertial force sensor according to claim 1, wherein in the first step, the plurality of blocks have triangular end surfaces connected to the inclined surfaces and the end surfaces have a right-angled isosceles triangle shape.

7. The method for manufacturing a multi-axial inertial force sensor according to claim 6, wherein the inclined surface corresponds to an oblique side of the right-angled isosceles triangle.

8. The method for manufacturing a multi-axial inertial force sensor according to claim 1, wherein in the first step, blocks all having the same shape are prepared as the plurality of blocks.

9. A method for manufacturing a multi-axial inertial force sensor that includes
a mounting material having an installation surface,
a plurality of blocks disposed on the installation surface of the mounting material and having inclined surfaces inclined with respect to the installation surface, and
a plurality of sensors disposed on the inclined surfaces of the plurality of blocks respectively, and configured to detect inertial force corresponding to main-axes, in which
the plurality of blocks have a positioning portion that, when the blocks come into contact with at least one or multiple of the plurality of blocks, relatively positions the blocks with respect to a contact partner, and a pedestal is configured with the blocks assembled into a state where the blocks are positioned relative to each other by the positioning portion and a state where the inclined surfaces are oriented in different directions from each other, the method comprising before the pedestal is assembled, an inspection step of inspecting a sensitivity of each of the plurality of sensors disposed in the plurality of blocks respectively, wherein the inspection step includes:

a first step of preparing the plurality of blocks in which the plurality of sensors are disposed respectively;

a second step of preparing an inspection tray in which a plurality of groove portions are formed, the plurality of groove portions having positioning surfaces with which the plurality of blocks are in contact for positioning such that a thickness direction of the inspection tray, corresponding to a depth direction of the groove portions, is parallel to the main-axes of the sensors;

a third step of fitting the plurality of blocks into the plurality of groove portions of the inspection tray and bringing the plurality of blocks into contact with the positioning surfaces of the plurality of groove portions to dispose the thickness direction of the inspection tray and the main-axes of the sensors in parallel;

a fourth step of preparing an inspection device including a turntable having a gimbal mechanism and installing the inspection tray on the gimbal mechanism to dispose a central axis of rotation of the turntable and the thickness direction of the inspection tray in parallel and to dispose the central axis of rotation of the turntable and the main-axes of the plurality of sensors in parallel; and a fifth step of pivoting or swinging the turntable to inspect the sensitivities, in three axes of the main-axes, first other-axes perpendicular to the main-axes, and second other-axes perpendicular to the main-axes and the first other-axes, of the plurality of sensors, in which the sensitivities in three axes of the main-axes, the first other-axes, and the second other-axes are inspected in a state where a central axis of rotation of the turntable and the first other-axes of the plurality of sensors are disposed in parallel by the gimbal mechanism, and the sensitivities in the three axes of the main-axes, the first other-axes, and the second other-axes are inspected in a state where the central axis of rotation of the turntable and the second other-axes of the plurality of sensors are disposed in parallel by the gimbal mechanism.

* * * * *